US012337570B2

(12) United States Patent
Saito et al.

(10) Patent No.: US 12,337,570 B2
(45) Date of Patent: Jun. 24, 2025

(54) MEDIUM PROCESSING APPARATUS AND IMAGE FORMING SYSTEM INCORPORATING SAME

(71) Applicants: Jun Saito, Kanagawa (JP); Kei Sasaki, Kanagawa (JP); Kazuki Seto, Kanagawa (JP)

(72) Inventors: Jun Saito, Kanagawa (JP); Kei Sasaki, Kanagawa (JP); Kazuki Seto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 187 days.

(21) Appl. No.: 18/159,238

(22) Filed: Jan. 25, 2023

(65) Prior Publication Data

US 2023/0241859 A1    Aug. 3, 2023

(30) Foreign Application Priority Data

Feb. 1, 2022   (JP) .................................. 2022-014287
Nov. 16, 2022  (JP) .................................. 2022-183724

(51) Int. Cl.
*B65H 37/04*     (2006.01)
*B31F 5/02*      (2006.01)

(52) U.S. Cl.
CPC ............. *B31F 5/02* (2013.01); *B65H 37/04* (2013.01); *B65H 2301/5142* (2013.01); *B65H 2301/51616* (2013.01)

(58) Field of Classification Search
CPC ...... B31F 1/07; B31F 5/02; B31F 2201/0784; B31F 2201/0754; B31F 2201/0707;
(Continued)

(56) References Cited

U.S. PATENT DOCUMENTS 10,406,772 B2 *  9/2019  Takahashi ................. B42C 1/12
10,654,240 B2 *  5/2020  Takahashi .............. B65H 37/04
(Continued)

FOREIGN PATENT DOCUMENTS

JP     H11-208976 A      8/1999
JP     2014-148398       8/2014
(Continued)

OTHER PUBLICATIONS

Espacenet machine translation of JP2015127116A; https://translationportal.epo.org/emtp/translate/?ACTION=description-retrieval&COUNTRY=JP&ENGINE=google&FORMAT=docdb&KIND=A&LOCALE=en_EP&NUMBER=2015127116&OPS=ops.epo.org/3.2&SRCLANG=ja&TRGLANG=en (Year: 2015).*
(Continued)

*Primary Examiner* — Leslie A Nicholson, III
(74) *Attorney, Agent, or Firm* — Harness, Dickey & Pierce, P.L.C.

(57) ABSTRACT

A medium processing apparatus includes a conveyor, a liquid applier, and a crimper. The conveyor conveys a medium. The liquid applier applies liquid to the medium conveyed by the conveyor. The crimper presses and deforms a medium bundle including at least one medium to which the liquid is applied by the liquid applier, to bind the medium bundle. The liquid applier selectively performs application of the liquid to all media constituting the medium bundle or application of the liquid to only some of the media constituting the medium bundle, based on a conveyance interval at which the media are conveyed by the conveyor.

16 Claims, 14 Drawing Sheets

(58) Field of Classification Search
CPC ..... G03G 15/6544; G03G 2215/00852; B65H 37/04; B65H 2301/51616; B65H 2301/43828; B65H 2801/27; B42C 1/12
See application file for complete search history.

(56) References Cited

U.S. PATENT DOCUMENTS

| | | | |
|---|---|---|---|
| 11,383,951 B2 * | 7/2022 | Kawakami | ............... B41J 11/58 |
| 11,987,468 B2 * | 5/2024 | Suzuki | ..................... B42C 1/12 |
| 2014/0219747 A1 | 8/2014 | Takahashi et al. | |
| 2015/0251475 A1 | 9/2015 | Taguchi | |
| 2020/0317462 A1 * | 10/2020 | Kawakami | ............... B42B 5/00 |
| 2022/0394145 A1 | 12/2022 | Seto et al. | |

FOREIGN PATENT DOCUMENTS

| | | | |
|---|---|---|---|
| JP | 2015-101009 | | 6/2015 |
| JP | 2015127116 A | * | 7/2015 |
| JP | 2016-016973 A | | 2/2016 |
| JP | 2019-043759 A | | 3/2019 |
| JP | 2020-172399 | | 10/2020 |

OTHER PUBLICATIONS

U.S. Appl. No. 18/153,023, filed Jan. 11, 2023, Junya Suzuki, et al.
U.S. Appl. No. 18/157,142, filed Jan. 20, 2023, Kensuke Fukuchi, et al.
Extended European Search Report dated May 2, 2023 issued in corresponding European Appln. No. 23153222.7.

* cited by examiner

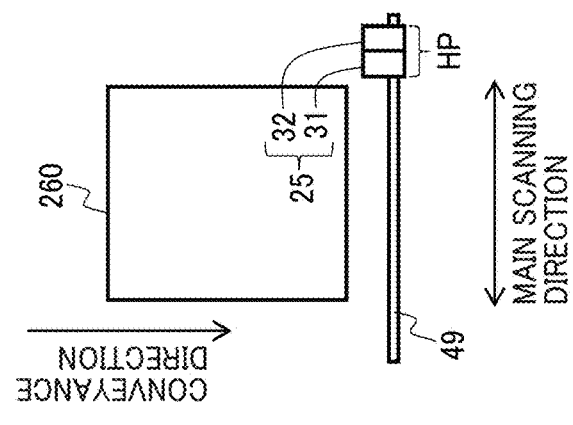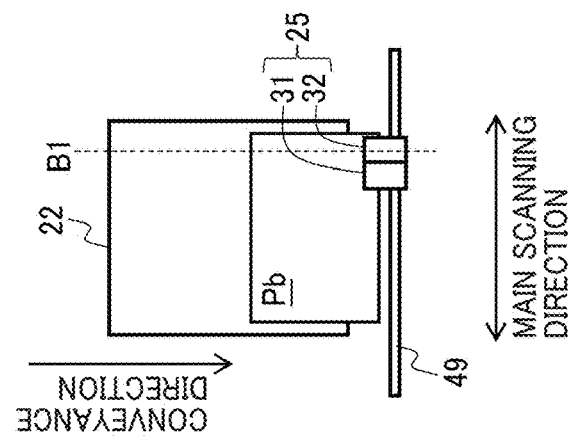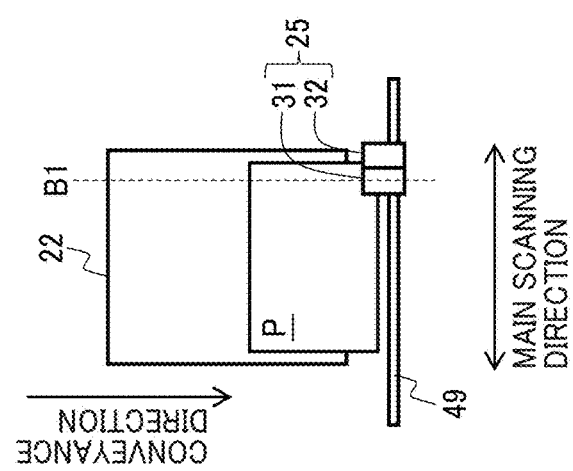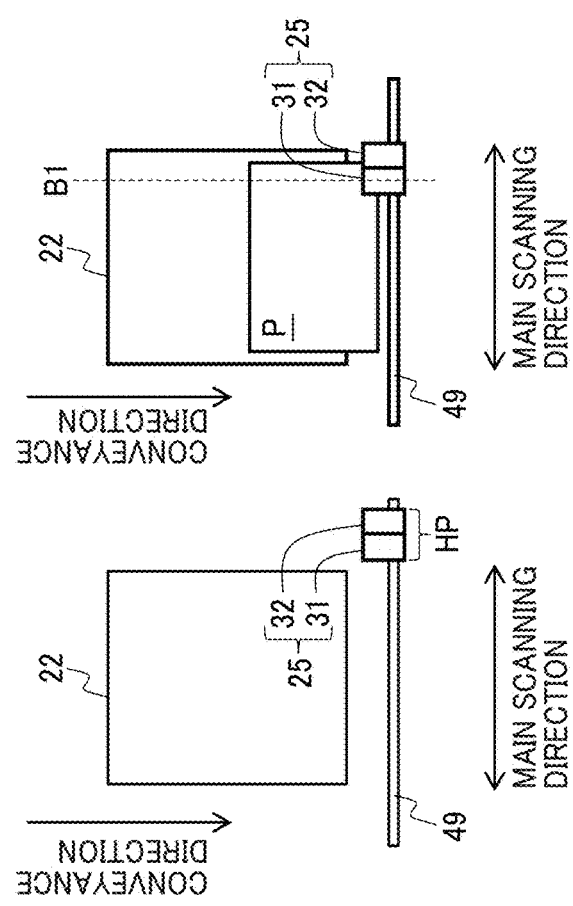

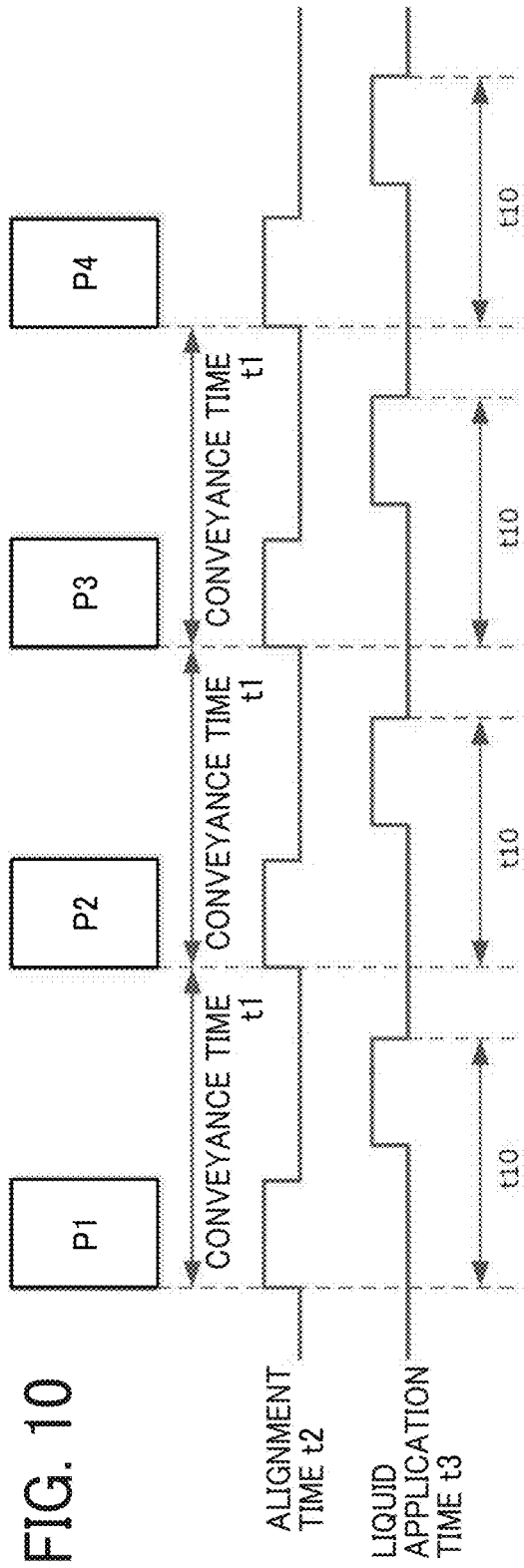
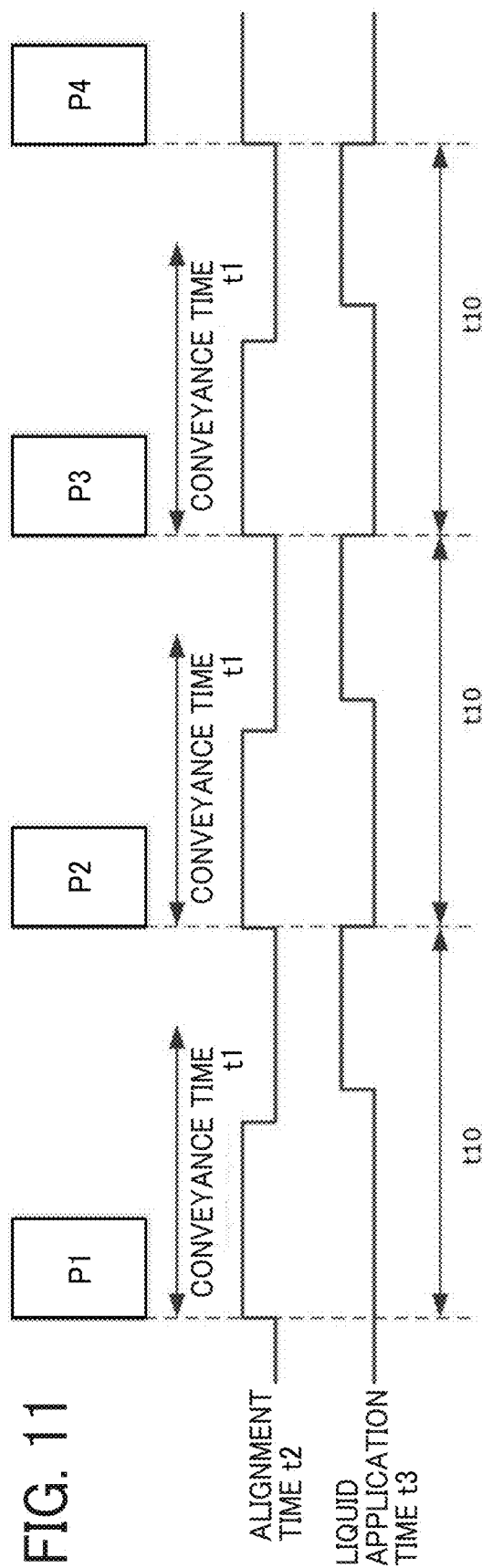

FIG. 16

| SHEET LENGTH [mm] (SUB-SCANNING LENGTH) | SHEET TYPE AND SHEET THICKNESS | TYPE A PRODUCTIVITY [ppm] | TYPE B PRODUCTIVITY [ppm] | TYPE C PRODUCTIVITY [ppm] |
|---|---|---|---|---|
| 139.7-216.0 | PLAIN PAPER SHEET | 100 | 120 | 70 |
| | THICK PAPER SHEET | 50 | 100 | 35 |
| 216.1-297.0 | PLAIN PAPER SHEET | 80 | 90 | 60 |
| | THICK PAPER SHEET | 40 | 80 | 30 |
| 297.1-364.0 | PLAIN PAPER SHEET | 65 | 75 | 45 |
| | THICK PAPER SHEET | 33 | 60 | 23 |
| 364.1-432.0 | PLAIN PAPER SHEET | 50 | 60 | 35 |
| | THICK PAPER SHEET | 25 | 40 | 17 |
| ⋮ | ⋮ | ⋮ | ⋮ | ⋮ |

MEDIUM PROCESSING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119 (a) to Japanese Patent Application Nos. 2022-014287, filed on Feb. 1, 2022, and 2022-183724, filed on Nov. 16, 2022, in the Japan Patent Office, the entire disclosure of each of which is hereby incorporated by reference herein.

BACKGROUND

Technical Field

Embodiments of the present disclosure relate to a medium processing apparatus and an image forming system incorporating the medium processing apparatus.

Related Art

Medium processing apparatuses are known that perform binding on a sheet bundle, which is a bundle of sheet-shaped media on which images are formed. Sheets of paper are widely known as an example of sheet-shaped media. For this reason, in the following description, a bundle of sheets of paper as a plurality of media is an example of a sheet bundle. Some medium processing apparatuses are also known that perform binding without metal binding needles (i.e., staples) from a viewpoint of resource saving and reduction in environmental load. Such medium processing apparatuses include a crimper that can perform so-called "crimp binding." Specifically, the crimper sandwiches a sheet bundle with serrate binding teeth to press and deform the sheet bundle.

As the thickness of the sheet bundle increases or the number of sheets in the sheet bundle increases, the binding teeth are less likely to bite into the sheet bundle and the retaining force for retaining the bound state weakens. For example, the bound sheets may be peeled off, and it is difficult to maintain the bound state. To increase the binding strength in a medium processing apparatus that performs crimp binding, a technique is known in which water is added in advance to a position (hereinafter, referred to as a "binding position") at which the binding teeth come into contact with sheets so that the binding teeth easily bite into the sheets.

SUMMARY

According to an aspect of the present disclosure, a medium processing apparatus includes a conveyor, a liquid applier, and a crimper. The conveyor conveys a medium. The liquid applier applies liquid to the medium conveyed by the conveyor. The crimper presses and deforms a medium bundle including at least one medium to which the liquid is applied by the liquid applier, to bind the medium bundle. The liquid applier selectively performs application of the liquid to all media constituting the medium bundle or application of the liquid to only some of the media constituting the medium bundle, based on a conveyance interval at which the media are conveyed by the conveyor.

According to another aspect of the present disclosure, an image forming system includes an image forming apparatus and the medium processing apparatus. The image forming apparatus includes an image former to form an image on a plurality of media. The medium processing apparatus crimps and binds the plurality of media on which the image is formed by the image forming apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 9A, 9B, 9C, and 9D are diagrams illustrating positions of a binder during the binding process of FIG. 8;

FIG. 10 is a timing chart illustrating an example of the relation between liquid application operation and conveyance time of a sheet;

FIG. 11 is a timing chart illustrating another example of the relation between liquid application operation and conveyance time of a sheet;

FIG. 16 is a data table that defines productivities serving as criteria for determining whether to perform a liquid application operation.

Figure 1:
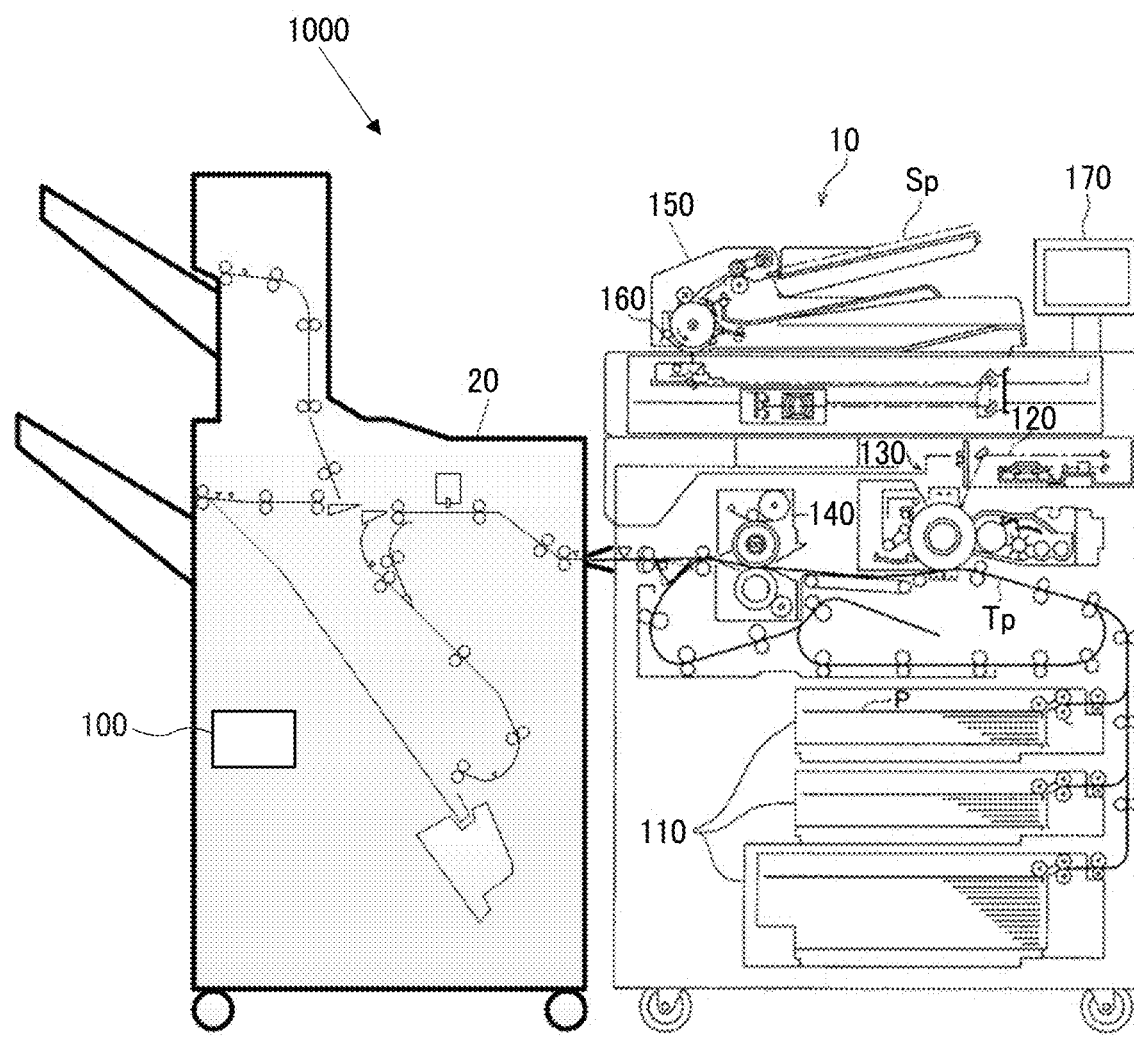
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the drawings, a description is now given of an image forming system 1000 according to an embodiment of the present disclosure. FIG. 1 is a diagram illustrating the overall configuration of the image forming system 1000. The image forming system 1000 has a function of forming an image on a sheet P as a sheet-shaped medium and performing post-processing on the sheet P on which the image is formed. As illustrated in FIG. 1, the image forming system 1000 includes a multi-function printer (MFP) 10 and a post-processing apparatus 20 serving as a medium processing apparatus according to the present embodiment.

The image forming system 1000 has a configuration in which the MFP 10 as an image forming apparatus that forms an image on a sheet P as a medium by an electrophotographic method and the post-processing apparatus 20 cooperate with each other. In other words, the image forming system 1000 has a configuration in which an entry port of the post-processing apparatus 20 is connected to an exit port through which the sheet P is ejected from the MFP 10. The operation of the post-processing apparatus 20 can be set based on parameters set in the MFP 10.

The configuration of an image forming system according to an embodiment of the present disclosure is not limited to the configuration of the image forming system 1000 illustrated in FIG. 1. For example, an image forming system according to an embodiment of the present disclosure may have a configuration in which the configuration of the post-processing apparatus 20 is included in the MFP 10. The post-processing apparatus 20 may be configured to operate based not only on parameters set in the MFP 10 but also on parameters set in the post-processing apparatus 20.

A description is given below of the outline of the MFP 10.

The MFP 10 serving as image forming apparatus includes a feeding unit 110, an optical writing unit 120, an image forming unit 130, a fixing unit 140, and a conveyance passage Tp that conveys a sheet P stored in the feeding unit 110 to the image forming unit 130. The MFP 10 also includes, as an image reading processing device, an automatic document feeder (ADF) 150 and an image reading unit 160 that optically reads a document Sp sent from the ADF 150. The MFP 10 also includes a user interface for a user to instruct execution of processing and set processing conditions, and a control panel 170 also serving as an information display unit for displaying operation states of the MFP 10 and the post-processing apparatus 20.

The feeding unit 110 includes a plurality of storage trays for storing sheets P and a pair of feeding rollers that feed the sheets P from each storage tray to the conveyance passage Tp. The feeding unit 110 feeds a designated number of sheets P to the conveyance passage Tp in response to an instruction to execute the image forming process.

The control panel 170 is an operation input interface for instructing an operation of the image forming system 1000, and also functions as an information input interface for allowing a user to set, for example, operation conditions of the image forming system 1000. The control panel 170 serves as a graphical user interface (GUI). When a start key as an operation start instruction of the MFP 10 is pressed, the image forming process is executed, an image is formed on the sheet P, and the sheet P is ejected.

The image reading unit 160 optically reads the document Sp placed on the ADF 150 by a charge-coupled device (CCD) image sensor, performs photoelectric conversion on read data, and outputs a read signal. The read signal is subjected to image processing by an image processing unit and converted into image data. The image data is stored in an image storage unit. The stored image data is read, converted into a control signal, and used for the operation of the optical writing unit 120.

The optical writing unit 120 outputs laser light optically modulated by the control signal, and forms a latent image on a photoconductive drum of the image forming unit 130 by a polygon mirror.

The image forming unit 130 as an image former causes toner as a developer by a developing device to adhere to the latent image formed on the photoconductive drum to form a toner image on the photoconductive drum. When the sheet P supplied from the feeding unit 110 is conveyed to the image forming unit 130 via the conveyance passage Tp, the toner image formed on the photoconductive drum is transferred to the sheet P.

The toner image transferred to the sheet P is fixed to the sheet P through the fixing unit 140. Through a series of processing, a desired image is formed on the sheet P.

The sheet P on which the image is formed by the MFP 10 is ejected to the post-processing apparatus 20 in the subsequent stage. The type and the processing conditions of the post-processing performed on the sheet P in the post-processing apparatus 20 may be based on the setting content set in advance via the control panel 170 included in the MFP 10, or may be based on the setting content set via a control panel included in the post-processing apparatus 20 as described later.

The post-processing apparatus 20 performs post-processing on the sheet P conveyed from the MFP 10. The post-processed sheet P or sheet bundle Pb is ejected to a tray part as an ejection destination disposed in the post-processing apparatus 20.

The image forming process in the MFP 10 is not only based on the document Sp read by the image reading unit 160. For example, the MFP 10 may receive data for image formation from an external device and execute the image forming process based on the data.

Next, a description is given below of the outline of the post-processing apparatus 20 as a medium conveyance device according to an embodiment of the present disclosure. The post-processing apparatus 20 includes an overlay conveyance section 250 as a retreat conveyance passage. The overlay conveyance section 250 enables "pre-stacking" in which a preceding medium conveyed in advance is temporarily retreated to a switchback conveyance passage and a plurality of subsequent media conveyed subsequently are overlaid with the preceding medium. The preceding medium and the subsequent media aligned by the pre-stacking are conveyed to the processing tray 260, which is described below, in an aligned state. The retreat conveyance passage is disposed upstream from the processing tray 260 in the conveyance direction of the sheet P.

The post-processing apparatus 20 performs designated post-processing on the sheet P ejected from the MFP 10 as a host apparatus. The post-processing executed in the post-processing apparatus 20 may be controlled by a control block included in the post-processing apparatus 20, as described later, based on information from the host apparatus or may be controlled by a control block included in the host apparatus (for example, the MFP 10).

The post-processing apparatus 20 includes, as conveyors, an entry conveyance section 210 continuing from the entry port that receives the sheet P ejected by the MFP 10, an upper-shift ejection conveyance section 220 and a lower-shift ejection conveyance section 230 that branch off on the downstream side of the entry conveyance section 210, and the overlay conveyance section 250.

The entry conveyance section 210 is provided with a punching unit PU that performs punching processing on the sheet P conveyed into the post-processing apparatus 20. The sheet P having passed through the entry conveyance section 210 is conveyed to an upper shift tray 227 via the upper-shift ejection conveyance section 220, conveyed to a lower shift tray 236 via the lower-shift ejection conveyance section 230, or conveyed to the overlay conveyance section 250. The sorting of the conveyance destinations of the sheet P is performed by a first branch claw bc1 and a second branch claw bc2 serving as separators disposed at a branch point of the conveyance passage.

The overlay conveyance section 250 is provided with a third branch claw bc3. The third branch claw bc3 switches the conveyance destination of the sheet P between the processing tray 260 conveyed through an overlay conveyance passage D as a first conveyance passage and a retreat conveyance passage E as a second conveyance passage conveyed in reverse.

In the entry conveyance section 210, a plurality of conveyance roller pairs (hereinafter, also simply referred to as conveyance roller pairs) 211, 212, 213, and 214 are arranged on an entry conveyance passage A from the entry port. The punching unit PU is disposed between the conveyance roller pair 213 and the conveyance roller pair 214.

The first branch claw bc1 is disposed downstream from the conveyance roller pair 214 in the conveyance direction of the sheet P. Switching the state of the first branch claw bc1 allows the conveyance direction of the sheet P to be switched to any one of the upper-shift conveyance passage B, the lower-shift conveyance passage C, and the overlay conveyance passage D. The second branch claw bc1 is further disposed downstream from the first branch claw bc2 in the conveyance direction of the sheet P. Switching the state of the second branch claw bc2 allows the conveyance direction of the sheet P to be switched to the upper-shift conveyance passage B or the lower-shift conveyance passage C.

The upper-shift ejection conveyance section 220 is provided with a plurality of pairs of conveyance rollers (hereinafter also simply referred to as conveyance roller pairs) 221, 222, 223, and 225, which arranged to form an upper-shift conveyance passage B. The sheet P having passed through the upper-shift conveyance passage B is ejected to the upper shift tray 227. An upper shift sensor 226 for detecting that the sheet P is ejected to the upper shift tray 227 is disposed in the vicinity of the exit port.

In the lower-shift ejection conveyance section 230, a plurality of pairs of conveyance rollers (hereinafter, also simply referred to as conveyance roller pairs) 231, 232, and 233 are arranged to form the lower-shift conveyance passage C. Lower shift sensors 234 and 235 for detecting that the sheet P is ejected to the lower shift tray 236 are disposed in the vicinity of the exit port.

The overlay conveyance passage D is formed in the overlay conveyance section 250. The third branch claw bc3 is disposed on the overlay conveyance passage D. A plurality of pairs of conveyance rollers (hereinafter, also simply referred to as conveyance roller pairs) such as a upstream conveyance roller pair 251, a downstream conveyance roller pair 252, a contact-separation conveyance roller pair 253, a retreat conveyance roller pair 254, and a processing-tray ejection roller pair 255 are arranged in the overlay conveyance section 250.

More specifically, the upstream conveyance roller pair 251 is disposed upstream from the third branch claw bc3, and the downstream conveyance roller pair 252 is disposed downstream from the third branch claw bc3. The contact-separation conveyance roller pair 253 is disposed between the upstream conveyance roller pair 251 and the downstream conveyance roller pair 252 and downstream from the third branch claw bc3. The retreat conveyance roller pair 254 is disposed in the retreat conveyance passage E.

The sheet P conveyed from the upstream side to the downstream side in the overlay conveyance section 250 is conveyed to the processing tray 260 as a conveyance destination through the processing-tray ejection roller pair 255. In the processing tray 260, alignment for aligning ends of a plurality of sheets P and liquid application for applying liquid to a binding position are performed. Then, binding is performed on the aligned end of the sheet bundle Pb by the binder 25. The sheet bundle Pb as a medium bundle subjected to the binding is ejected to the lower shift tray 236 via the lower-shift conveyance passage C.

In the post-processing apparatus 20, post-processing performed on the sheets P is processing for binding a bundle (sheet bundle Pb) of a plurality of sheets P on which images are formed. More specifically, the binding process according to the present embodiment includes so-called "crimp binding" and "stapling." The crimp binding is a process to press and deform the sheet bundle Pb at a binding position. The stapling is a process to bind the sheet bundle Pb with a staple. In the present specification, descriptions of configurations and operations related to stapling may be omitted.

A description is given of an example of the configuration of the binder 25 and the processing tray 260.

Figure 2:
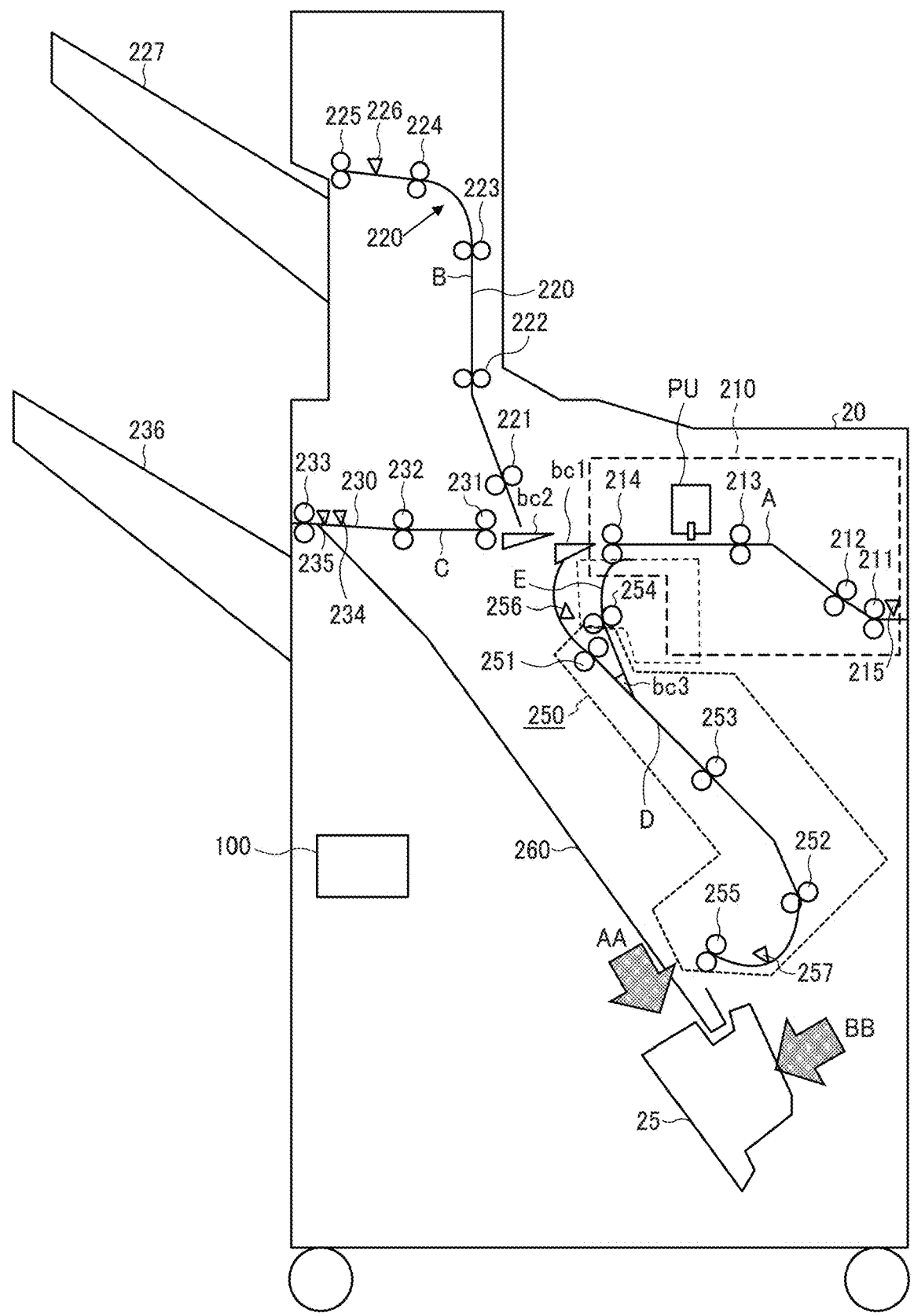
FIG. 2 is a diagram illustrating an internal configuration of a post-processing apparatus in the image forming system of FIG. 1.
Figure 3:
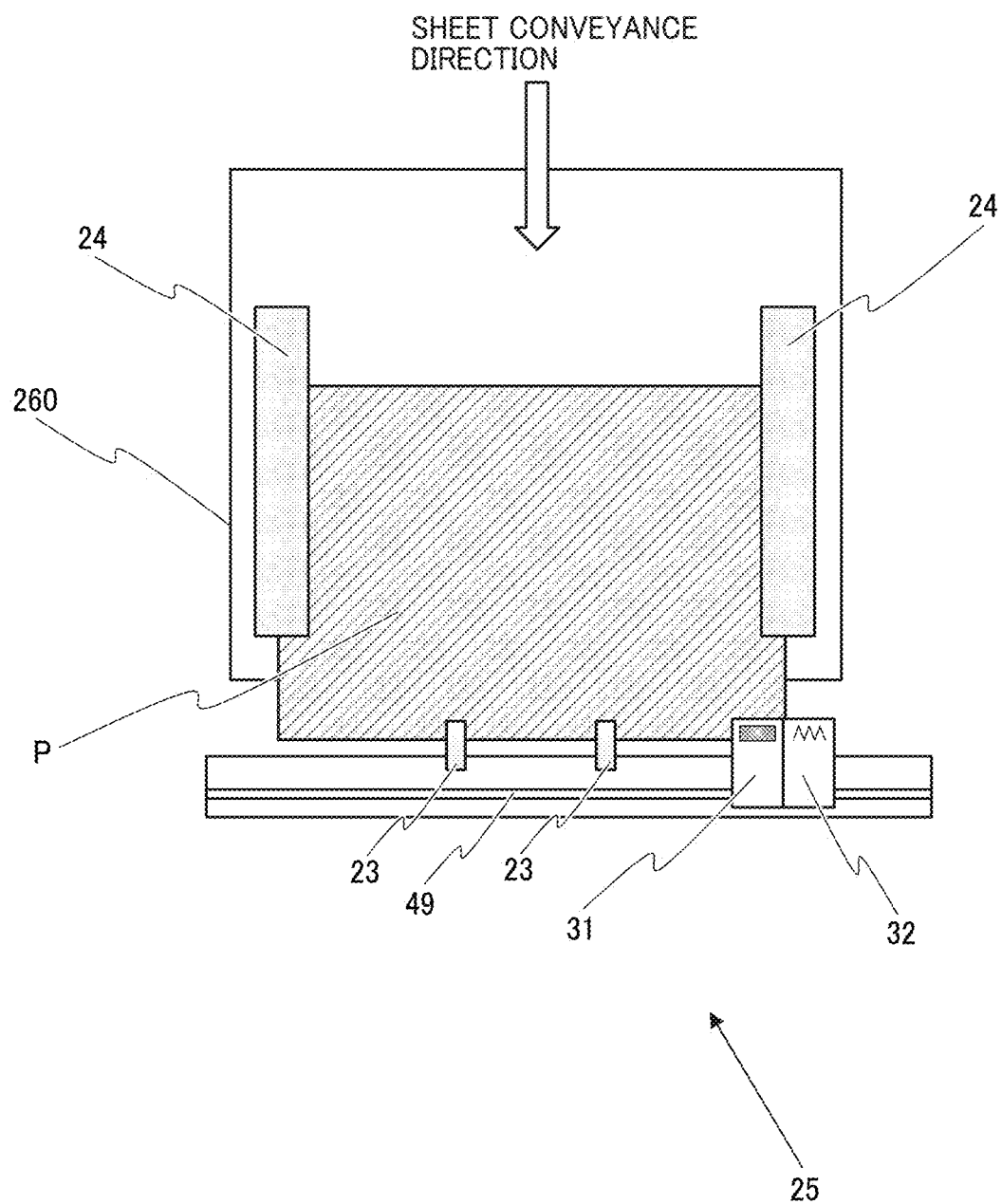
FIG. 3 is a schematic view of a processing tray viewed from an upper surface side thereof.

With reference to FIG. 3, a description is given below of the binder 25 as a binding device included in the post-processing apparatus 20 and the processing tray 260 on which sheets P are placed when the binder 25 performs binding on the sheets P. FIG. 3 is a schematic view of the binder 25 seen from the direction indicated by arrow BB in FIG. 2.

The sheet P is conveyed to the processing tray 260 by the processing-tray ejection roller pair 255. The white arrow illustrated in FIG. 3 indicates the conveyance direction of the sheet P in this specification. When the sheet P is ejected to the processing tray 260 after being conveyed by the processing-tray ejection roller pair 255, the sheet P slides down on an inclined placement surface of the processing tray 260 by gravity to reach the placement position. In the present specification, a direction indicated by a white arrow (a direction in which a sheet slides down on the placement surface and is stored) is defined as a conveyance direction. In some embodiments, the sheet P on the placement surface may be conveyed by a tapping roller that pushes the sheet P in a direction indicated by the white arrow or may be moved by a leading end jogger, instead of the gravity.

When binding is performed on an end of the sheet bundle Pb in the binder 25, alignment for aligning the end of the sheet P or the sheet bundle Pb in the processing tray 260 is executed. As illustrated in FIG. 3, the processing tray 260 includes a pair of side fences 24 and end fences 23. The pair of side fences 24 define the positions of side ends of the sheet P or the sheet bundle Pb in order to perform the alignment. The end fences 23 define the position of a leading end of the sheet P or the sheet bundle Pb conveyed toward the binder 25. The side fences 24 and the end fences 23 align ends of the sheets P or the sheet bundle Pb stacked on the processing tray 260, and a preparation for executing binding is performed.

First, alignment is performed on the sheet P conveyed to the processing tray 260. Then, after the liquid application is performed on the last sheet Pe as the last medium of the sheet bundle Pb, the binding is performed. The binding is performed on a liquid applied position (corresponding to the binding position B1 in FIG. 9) that is a predetermined position in a direction orthogonal to the conveyance direction. The sheet bundle Pb subjected to the binding is ejected from the post-processing apparatus 20. The liquid application is performed for each sheet P for which the alignment has been completed.

As already described, the direction toward a state in which the sheet is placed on the processing tray 260 is defined as a "conveyance direction" (sheet conveyance direction in FIG. 3). The direction that is orthogonal to the conveyance direction and a thickness direction of the sheet P is defined as a "main scanning direction" or a "width direction of the sheet P."

Figure 4:
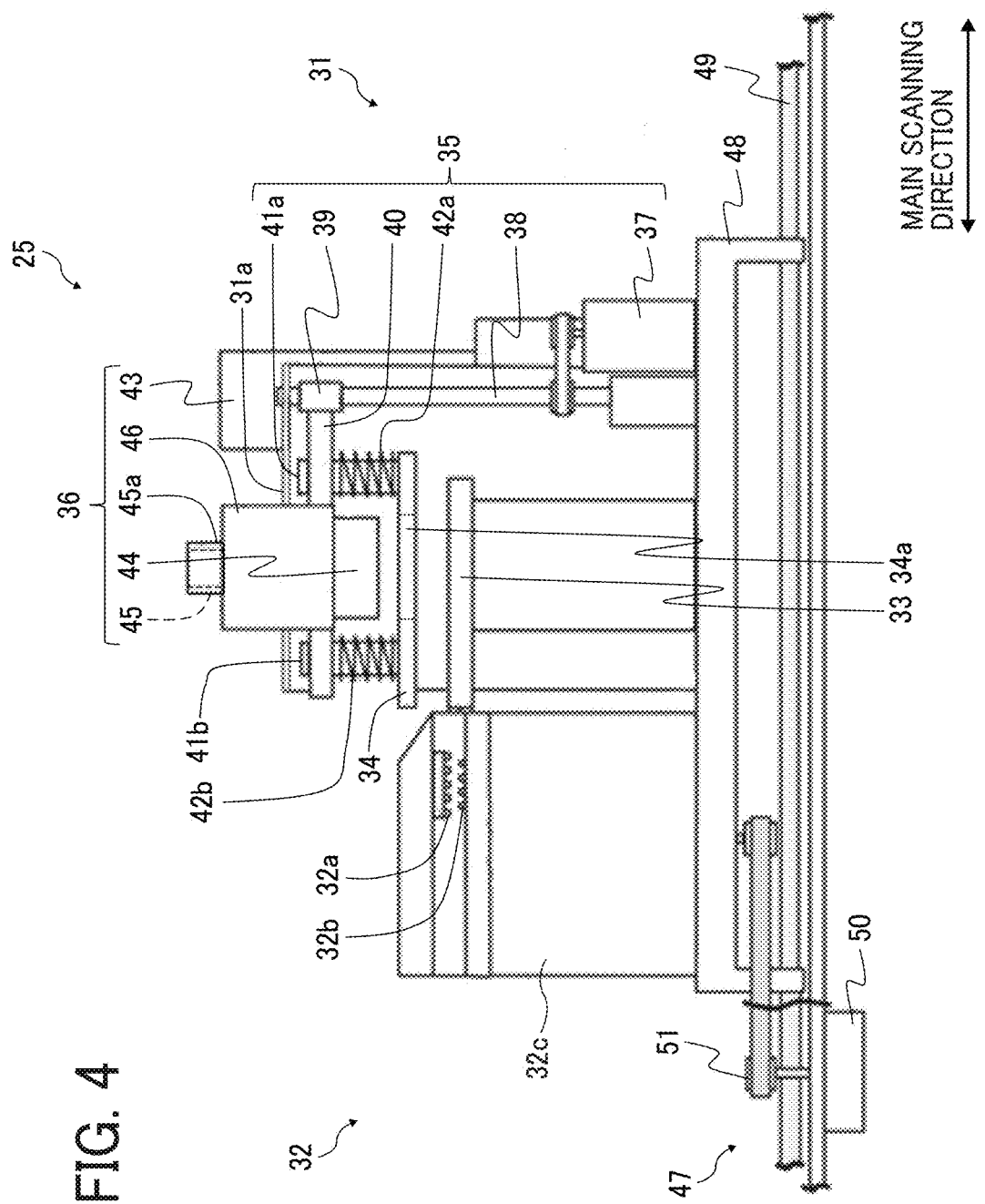
FIG. 4 is a schematic view of an upstream side of a binder in a conveyance direction, according to an embodiment of the present disclosure.

FIG. 4 is a schematic view of an upstream side of the binder 25 in the conveyance direction. FIG. 4 is a schematic view of the binder 25 seen from the direction indicated by arrow AA in FIG. 2. As illustrated in FIG. 4, the binder 25 includes a liquid applier 31 and a crimper 32. The liquid applier 31 and the crimper 32 are disposed downstream from the processing tray 260 in the conveyance direction and adjacent to each other in the main scanning direction.

The liquid applier 31 applies liquid (for example, water) that is stored in a liquid storage tank 43 to the sheet P or the sheet bundle Pb placed on the processing tray 260. In the following description, the application of liquid may be referred to as "liquid application." A position (liquid applied position) to which the liquid is applied on the sheet P or the sheet bundle Pb by the liquid applier 31 corresponds to the binding position (e.g., the binding position B1 of FIG. 9) to be crimped and bound by the crimper 32. As illustrated in FIG. 4, the liquid applier 31 includes a lower pressure plate 33, an upper pressure plate 34, a movement mechanism 35, and a liquid application mechanism 36.

More specifically, the liquid that is stored in the liquid storage tank 43 and used for the "liquid application" includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in a liquid storage tank 43 may include an additive in addition to the main component. The liquid that is stored in the liquid storage tank 43 may include residual chlorine used as tap water. Preferably, for example, the liquid that is stored in the liquid storage tank 43 may include, as an additive, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used for the "liquid application."

The water is not limited to the specific examples described above. The water may be water in a broad sense such as hypochlorous acid water or an ethanol aqueous solution diluted for disinfection. However, tap water may be used simply for the crimp binding because tap water is easy to obtain and store. A liquid including water as a main component as exemplified above enhances the binding strength of the sheet bundle Pb, as compared with a liquid of which the main component is not water.

The lower pressure plate 33 and the upper pressure plate 34 are disposed downstream from the processing tray 260 in the conveyance direction. The lower pressure plate 33 supports, from below, the sheet P or the sheet bundle Pb placed on the processing tray 260. The lower pressure plate 33 is disposed on a lower-pressure-plate holder 331. The upper pressure plate 34 can move above the sheet P or the sheet bundle Pb placed on the processing tray 260. In other words, the lower pressure plate 33 and the upper pressure plate 34 are disposed to face each other in the thickness direction of the sheet P or the sheet bundle Pb with the sheet P or the sheet bundle Pb placed on the processing tray 260 and interposed between the lower pressure plate 33 and the upper pressure plate 34. In the following description, the thickness direction of the sheet P or the sheet bundle Pb may be referred to simply as "thickness direction." The upper pressure plate 34 has a through hole 34a penetrating in the thickness direction at a position where the through hole 34a faces an end of a liquid application member 44 attached to a base plate 40.

The movement mechanism 35 moves the upper pressure plate 34, the base plate 40, and the liquid application member 44 in the thickness direction of the sheet P or the sheet bundle Pb. The movement mechanism 35 according to the present embodiment moves the upper pressure plate 34, the base plate 40, and the liquid application member 44 in conjunction with each other with a single liquid applier movement motor 37. The movement mechanism 35 includes, for example, the liquid applier movement motor 37, a trapezoidal screw 38, a nut 39, the base plate 40, columns 41a and 41b, and coil springs 42a and 42b.

The liquid applier movement motor 37 generates a driving force to move the upper pressure plate 34, the base plate 40, and the liquid application member 44. The trapezoidal screw 38 extends in a vertical direction in FIGS. 3 and 4 and is rotatably attached to the liquid application frame 31a. The trapezoidal screw 38 is coupled to an output shaft of the liquid applier movement motor 37 via, for example, a pulley and a belt. The nut 39 is screwed to the trapezoidal screw 38. The trapezoidal screw 38 is rotated by the driving force transmitted from the liquid applier movement motor 37. The rotation of the trapezoidal screw 38 moves the nut 39.

The base plate 40 is a flat plate parallel to the sheet P or the sheet bundle Pb placed on the processing tray 260. The base plate 40 is disposed above the upper pressure plate 34. The base plate 40 holds the liquid application member 44 with the end of the liquid application member 44 projecting downward. The base plate 40 is coupled to the trapezoidal screw 38 to move together with the trapezoidal screw 38.

The position of the base plate 40 in the vertical direction is detected by a movement sensor 40a.

The columns 41a and 41b project downward from the base plate 40 around the end of the liquid application member 44. The columns 41a and 41b can move relative to the base plate 40 in the thickness direction. The columns 41a and 41b have respective lower ends holding the upper pressure plate 34. The coil springs 42a and 42b are fitted around the columns 41a and 41b, respectively, between the base plate 40 and the upper pressure plate 34. The coil springs 42a and 42b bias the upper pressure plate 34 and the columns 41a and 41b downward with respect to the base plate 40.

The liquid application mechanism 36 applies liquid to the sheet P or the sheet bundle Pb placed on the processing tray 260. Specifically, the liquid application mechanism 36 brings the end of the liquid application member 44 into contact with the sheet P or the sheet bundle Pb to apply the liquid to at least one sheet P of the sheet bundle Pb. The liquid application mechanism 36 includes the liquid storage tank 43, the liquid application member 44, a supplier 45, and a joint 46.

The liquid storage tank 43 stores water to be supplied to the sheet P or the sheet bundle Pb. The amount of water that is stored in the liquid storage tank 43 is detected by a liquid amount sensor 43a. The liquid application member 44 applies water stored in the liquid storage tank 43 to the sheet P or the sheet bundle Pb. The liquid application member 44 is mounted on the base plate 40 with an end of the liquid application member 44 facing downward. The liquid application member 44 is made of a material having a relatively high liquid absorption (for example, sponge or fiber).

The supplier 45 is an elongated member having a base end immersed in the liquid stored in the liquid storage tank 43 and another end coupled to the liquid application member 44. Like the liquid application member 44, for example, the supplier 45 is made of a material having a relatively high liquid absorption. Accordingly, water absorbed from the base end of the supplier 45 is supplied to the liquid application member 44 by capillary action.

A protector 45a is an elongated cylindrical body (for example, a tube) that is fitted around the supplier 45. Such a configuration prevents the liquid absorbed by the supplier 45 from leaking or evaporating. Each of the supplier 45 and the protector 45a is made of a flexible material. The joint 46 fixes the liquid application member 44 to the base plate 40. Accordingly, the liquid application member 44 keeps projecting downward from the base plate 40 with the end of the liquid application member 44 facing downward when the liquid application member 44 is moved by the movement mechanism 35.

The crimper 32 presses and deforms the sheet bundle Pb with serrate binding teeth 32a and 32b to bind the sheet bundle Pb. In the following description, such a binding way may be referred to as "crimp binding." In other words, the crimper 32 crimps and binds the sheet bundle Pb or performs the crimp binding on the sheet bundle Pb. In short, the crimper 32 binds the sheet bundle Pb without using staples. The components of the crimper 32 such as the binding teeth 32a serving as upper crimping teeth and the binding teeth 32b serving as lower crimping teeth are disposed on a crimping frame 32c.

Figure 5A:
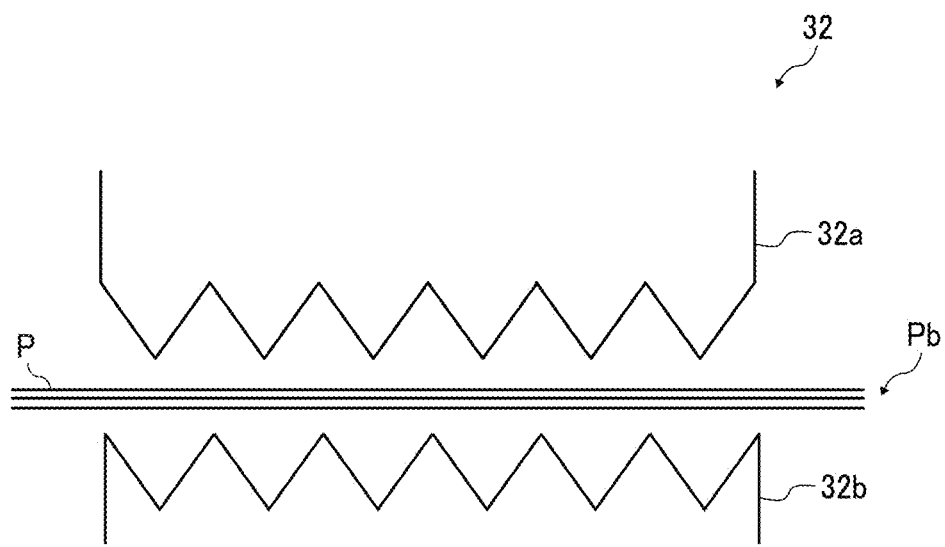
FIGS. 5A and 5B are schematic diagrams illustrating a configuration of a crimper of the post-processing apparatus of FIG. 2.
Figure 5B:

FIGS. 5A and 5B are schematic diagrams illustrating the configuration of the crimper 32. As illustrated in FIGS. 5A and 5B, the crimper 32 includes the pair of binding teeth 32a and 32b. The binding teeth 32a and the binding teeth 32b are disposed to face each other in the thickness direction of the sheet bundle Pb so that the binding teeth 32a and the binding teeth 32b can sandwich the sheet bundle Pb placed on the processing tray 260. The binding teeth 32a and the binding teeth 32b have respective serrate faces facing each other. The serrate face of each of the binding teeth 32a and the binding teeth 32b includes concave portions and convex portions alternately formed. The concave portions and the convex portions of the binding teeth 32a are shifted from those of the binding teeth 32b such that the binding teeth 32a are engaged with the binding teeth 32b. The binding teeth 32a and the binding teeth 32b are brought into contact with and separated from each other by a driving force of a contact-separation motor 32d illustrated in FIG. 6.

In a process in which the sheets P of the sheet bundle Pb are supplied to the processing tray 260, the binding teeth 32a and the binding teeth 32b are apart from each other as illustrated in FIG. 5A. When all the sheets P of the sheet bundle Pb are placed on the processing tray 260, the binding teeth 32a and the binding teeth 32b are engaged with each other to press and deform the sheet bundle Pb in the thickness direction as illustrated in FIG. 5B. Thus, the sheet bundle Pb that has been placed on the processing tray 260 is crimped and bound. The sheet bundle thus crimped and bound is output to the lower shift tray 236 by the conveyance roller pairs.

The configuration of the crimper 32 as a crimping mechanism is not limited to the configuration of the present embodiment provided that the binding teeth 32a and the binding teeth 32b of the crimping mechanism are engaged with each other. For example, the crimping mechanism may bring the binding teeth 32a and the binding teeth 32b into contact with each other and separate the binding teeth 32a and the binding teeth 32b form each other with a link mechanism and a driving source that simply rotates forward or that rotates forward and backward (for example, the crimping mechanism disclosed in Japanese Patent No. 6057167). Alternatively, the crimping mechanism may employ a linear motion system to linearly bring the binding teeth 32a and the binding teeth 32b into contact with each other and separate the binding teeth 32a and the binding teeth 32b form each other with a screw mechanism that converts the rotational motion of a driving source into linear motion.

As illustrated in FIG. 4, the binder 25 includes a binder movement assembly 47. The binder movement assembly 47 moves the binder 25 (in other words, the liquid applier 31 and the crimper 32) in the main scanning direction along the downstream end of the sheet P in the conveyance direction, which is placed on the processing tray 260. The binder movement assembly 47 includes, for example, the base 48, a guide shaft 49, a binder movement motor 50, and a driving force transmission assembly 51.

The liquid applier 31 and the crimper 32 are attached to the base 48 in the state in which the liquid applier 31 and the crimper 32 are adjacent to each other in the main scanning direction. The guide shaft 49 extends in the main scanning direction at a position downstream from the processing tray 260 in the conveyance direction of the sheet P. The guide shaft 49 supports the base 48 such that the base 48 can move in the main scanning direction. The binder movement motor 50 generates a driving force to move the binder 25. The driving force transmission assembly 51 transmits the driving force of the binder movement motor 50 to the base 48 via a pulley and a timing belt. As a result, the liquid applier 31 and the crimper 32 integrated by the base 48 move in the main scanning direction along the guide shaft 49.

A description is given below of the control block of the post-processing apparatus 20.

Figure 6:
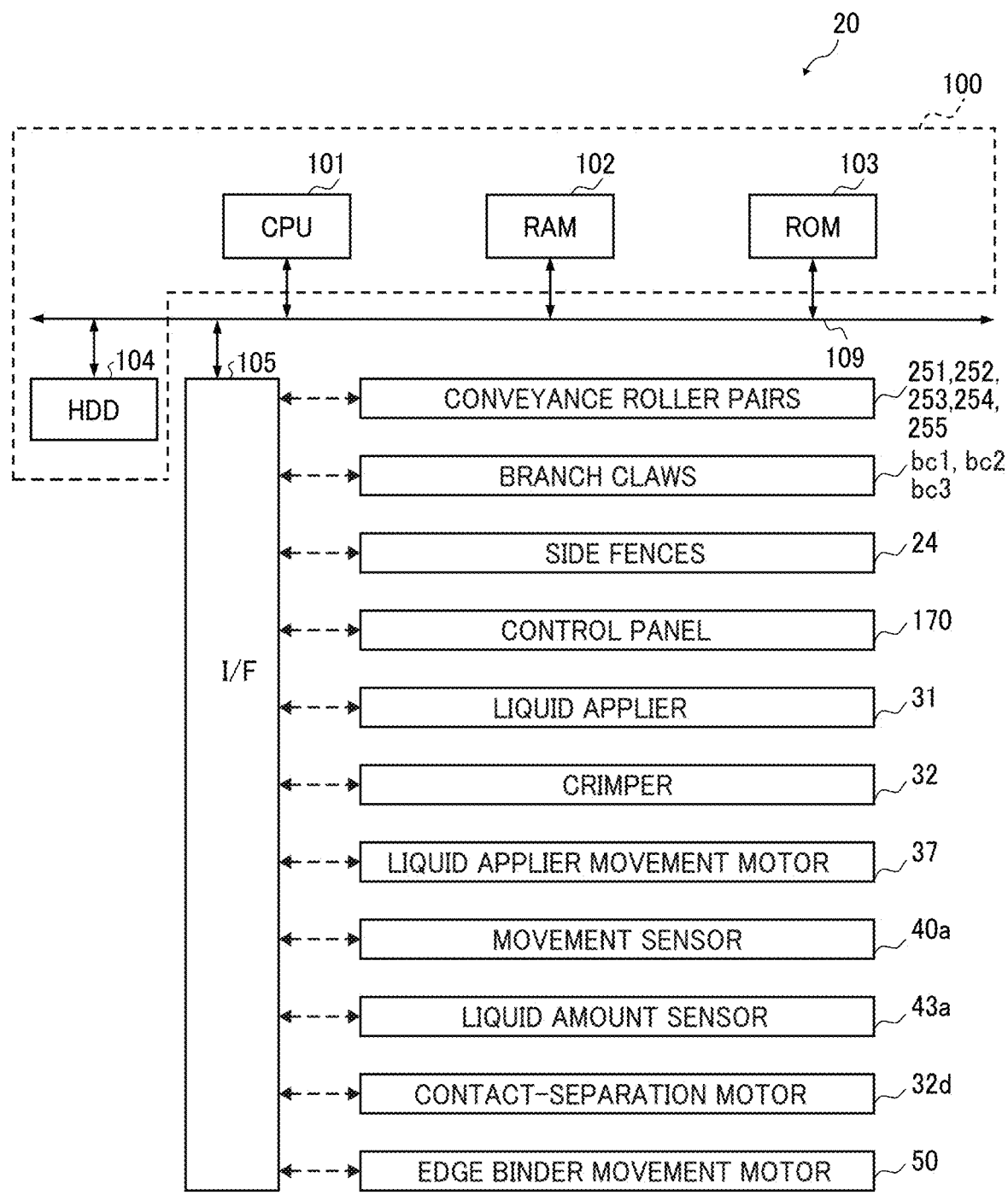
FIG. 6 is a block diagram illustrating a hardware configuration of the post-processing apparatus of FIG. 2 to control the operation of the post-processing apparatus.

FIG. 6 is a block diagram illustrating a hardware configuration of the post-processing apparatus 20 to control an operation of the post-processing apparatus 20. As illustrated in FIG. 6, the post-processing apparatus 20 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 20. The RAM 102 is a volatile storage medium that allows data to be read and written at high speed. The CPU 101 uses the RAM 102 as a working area for data processing. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 20 processes, for example, a control program stored in the ROM 103 and an information processing program (application program) loaded into the RAM 102 from a storage medium such as the HDD 104. Such processing configures a software controller including various functional modules of the post-processing apparatus 20. The software controller thus configured cooperates with hardware resources of the post-processing apparatus 20 to construct functional blocks that implement functions of the post-processing apparatus 20. In other words, the CPU 101, the RAM 102, the ROM 103, and the HDD 104 construct the controller 100 as a control block that controls the operation of the post-processing apparatus 20.

The I/F 105 is an interface that connects the conveyance roller pairs (e.g., the upstream conveyance roller pair 251, the downstream conveyance roller pair 252, the contact-separation conveyance roller pair 253, the retreat conveyance roller pair 254, and the processing-tray ejection roller pair 255), the branch claws (e.g., the branch claws bc1, bc2, and bc3), the side fences 24, the liquid applier 31, the crimper 32, the liquid applier movement motor 37, the contact-separation motor 32d, the binder movement motor 50, and the control panel 170 to the common bus 109. The controller 100 operates the conveyance roller pairs, the branch claws, the side fences 24, the liquid applier 31, the crimper 32, the liquid applier movement motor 37, the contact-separation motor 32d, and the binder movement motor 50 through the I/F 105. FIG. 6 illustrates components that execute the edge stitching.

As illustrated in FIG. 1, the MFP 10 includes the control panel 170. The control panel 170 includes an operation unit that receives instructions input by a user and a display serving as a notifier that notifies the user of information. The operation unit as an input device includes, for example, hard keys and a touch screen overlaid on a display. The control panel 170 acquires information from the user through the operation unit and provides information to the user through the display. The post-processing apparatus 20 may also include a control panel 170 similarly with the MFP 10 described above.

Figure 7:
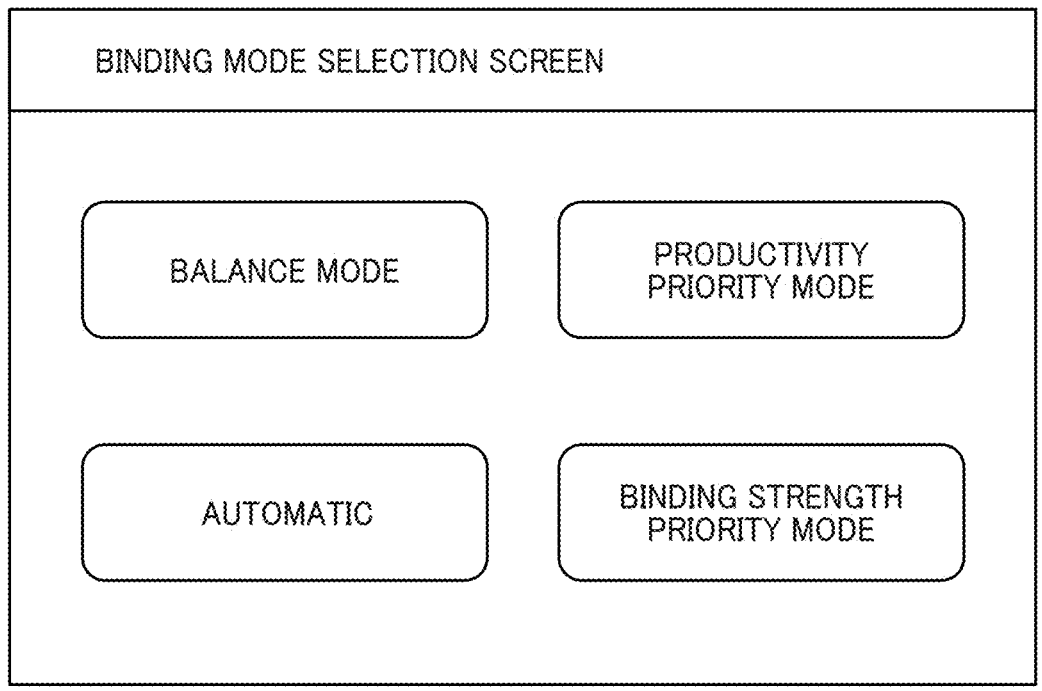
FIG. 7 is a display example of a binding mode selection screen displayed on a display.

FIG. 7 is a display example of a binding mode selection screen displayed on the display. The binding mode selection screen is displayed on the control panel 170 as an operation mode setting unit, and is a screen for allowing a user of the post-processing apparatus 20 to select a binding mode of the binding process which is described later.

The binding modes are for switching the productivity (throughput) and the binding strength of the processing of crimping and binding a plurality of binding positions. In other words, the binding modes are for switching the operation timing of the crimper 32 and the liquid applier 31 in the crimp binding. The binding modes include, for example, a productivity priority mode, a binding strength priority mode, and a balance mode.

The productivity priority mode is a mode in which the productivity is prioritized over the strength of the crimp binding. More specifically, the productivity priority mode is a binding mode in which the number of times of liquid application by the liquid applier 31 is smaller than that in the binding strength priority mode. In the productivity priority mode, for example, when the controller 100 can determine that it is advantageous to perform binding without applying liquid to a certain sheet P from the viewpoint of productivity, the controller 100 performs binding on a sheet bundle Pb including a sheet P on which liquid application is not performed, instead of performing liquid application on a sheet P every time. In other words, the productivity priority mode is a mode in which the number of times of thinning out the liquid application on the sheet bundle Pb (the number of times of skipping the liquid application or the number of times of pre-stacking) is larger than in any of the binding strength priority mode and the balance mode. The productivity priority mode may be, for example, a mode in which liquid application is thinned out for 60% or more of the plurality of sheets P constituting the sheet bundle Pb.

The binding strength priority mode is a mode in which the strength of crimp binding is prioritized over the productivity. Since the liquid application is prioritized, the binding strength priority mode corresponds to a "liquid application priority mode". More specifically, the binding strength priority mode is a binding mode in which the number of times of liquid application by the liquid applier 31 is increased as compared with the productivity priority mode and the balance mode. The binding strength priority mode is, for example, a mode in which liquid application is performed on sheets P every time, even when the controller 100 can determine that when liquid is applied to a certain sheet P, the conveyance of the subsequent sheet is temporarily waited and the productivity is reduced. In other words, the binding strength priority mode is a mode in which the number of times of thinning out the liquid application on the sheet bundle Pb (the number of times of skipping the liquid application or the number of times of pre-stacking) is smaller than in any of the productivity priority mode and the balance mode. The binding strength priority mode may be, for example, a mode in which liquid application is thinned out for 40% or lower of the plurality of sheets P constituting the sheet bundle Pb.

The balance mode is a binding mode in which the productivity and the strength of crimp binding are balanced. More specifically, the balance mode is a binding mode in which the number of times of liquid application to a plurality of binding positions is equalized to increase the strength of the crimp binding as compared to the productivity priority mode. The balance mode is also a binding mode in which the number of times of liquid application by the liquid applier 31 is decreased as compared to that in the binding strength priority mode, to increase the productivity as compared to the productivity in the binding strength priority mode. In other words, the balance mode is a mode in which the number of times of thinning out the liquid application on the sheet bundle Pb (the number of times of skipping the liquid application or the number of times of pre-stacking) is an approximately intermediate value between the productivity priority mode and the binding strength priority mode. The binding strength priority mode may be, for example, a mode in which liquid application is thinned out for 50% of the plurality of sheets P constituting the sheet bundle Pb.

As illustrated in FIG. 7, the binding mode selection screen includes a "productivity priority mode" button corresponding to the productivity priority mode, a "binding strength priority mode" button corresponding to the binding strength priority mode, a "balance mode" button corresponding to the balance mode, and an "automatic" button. The "automatic" button corresponds to the controller 100 determining the binding mode based on the conditions of executing the binding process (for example, the given number N of the sheets P constituting the sheet bundle Pb and the liquid absorbency of the sheets P).

The user of the post-processing apparatus 20 presses (performs an input operation on) a button corresponding to a desired binding mode among the plurality of buttons included in the binding mode selection screen. The controller 100 switches to the binding mode corresponding to the pressed button (input operation through the operation unit). The binding modes are not limited to the three modes of the productivity priority mode, the binding strength priority mode, and the balance mode. For example, any one of the three modes may be omitted.

A description is given below of a binding process.

Figure 8:
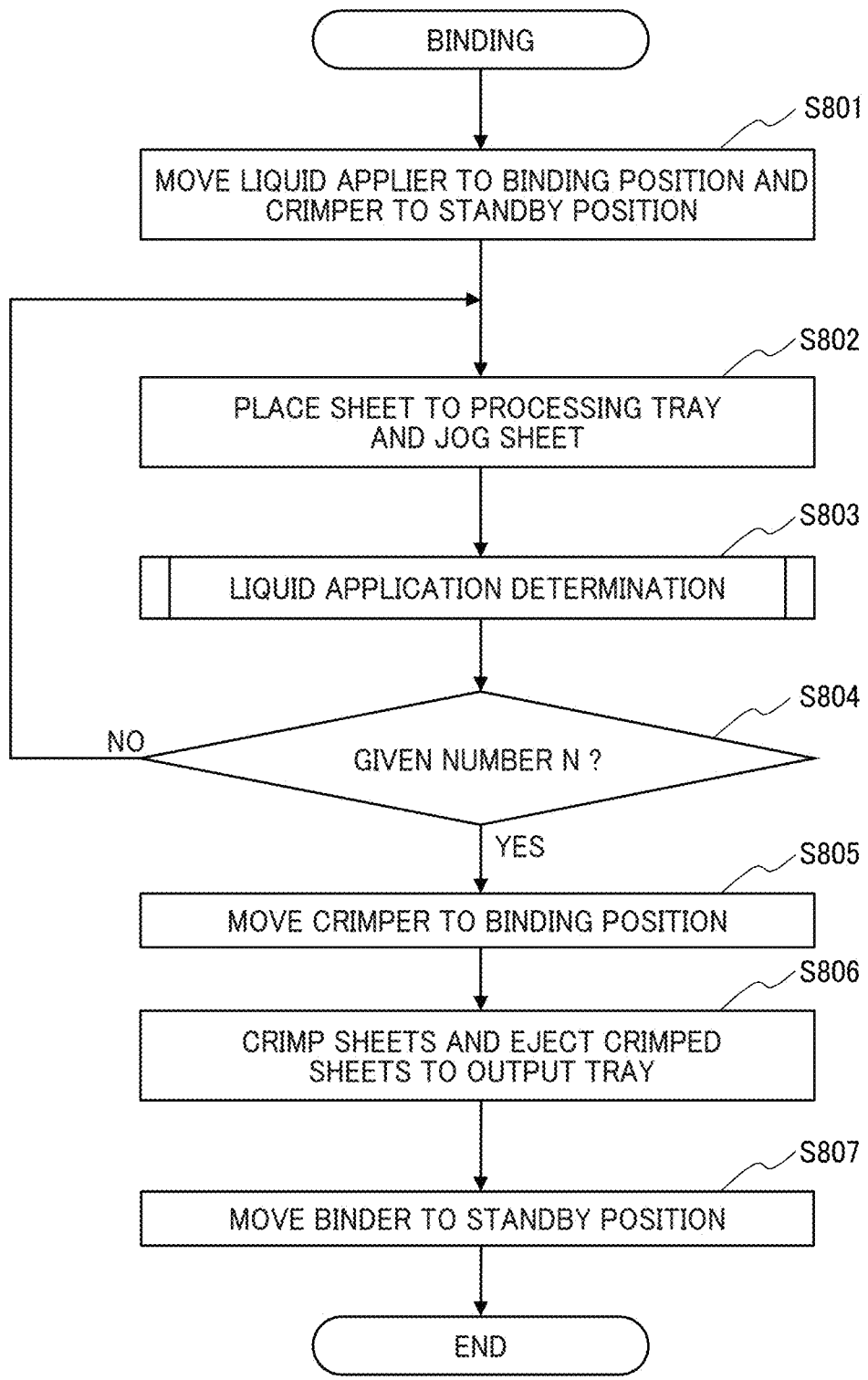
FIG. 8 is a flowchart of a binding process that crimps and binds a sheet bundle at a binding position.

With reference to a flowchart and a timing chart, a description is given of an example of the binding process executed in the medium processing apparatus according to the present embodiment. FIG. 8 is a flowchart of a binding process. The binding process illustrated in FIG. 8 is an example of a binding process executed when an "automatic" button is selected on a binding mode selection screen. For example, the controller 100 executes the binding process in response to acquisition of an instruction to execute the binding process (hereinafter, referred to as a "binding instruction") from the MFP 10.

FIGS. 9A to 9D are diagrams illustrating the positions of the liquid applier 31 and the crimper 32 during the binding process of FIG. 8. It is assumed that the binder 25 is placed at a standby position HP at the start point of the binding process.

In step S801, as illustrated in FIG. 9A, the controller 100 drives the binder movement motor 50 to move the binder 25 in the main scanning direction so that the liquid applier 31 faces the binding position B1 (in other words, the liquid applied position B1).

In step S802, the controller 100 rotates conveyance roller pairs to place a sheet P, on which an image is formed by the MFP 10, on the processing tray 260. The controller 100 also moves the side fences 24 to align the positions of sheets P placed on the processing tray 260 in the main scanning direction (in other words, jog the sheets P).

In step S803, the controller 100 executes a liquid application determination process for determining whether to execute liquid application on the binding position B1 of the sheet P placed on the processing tray 260 in the immediately preceding step S802. Detailed processing contents of the step S803 will be described below. When the liquid application is controlled to be performed in step S803, the controller 100 moves the liquid applier 31 to the binding position and performs the liquid application. Normally, when the liquid application is executed, the controller 100 drives the liquid applier movement motor 37 to bring the liquid application member 44 into contact with the binding position B1 of the sheet P placed on the processing tray 260.

In step S804, the controller 100 determines whether the number of sheets P placed on the processing tray 260 has reached the given number N of sheets instructed by the binding command. The given number N of sheets corresponds to the number of sheets P constituting one sheet bundle Pb. When the controller 100 determines that the number of sheets P placed on the processing tray 260 has not reached the given number N of sheets (NO in step S804), the controller 100 executes the operations of steps S802 and S803 again.

In other words, the controller 100 executes the operations of steps S802 and 803 each time the sheet P is conveyed to the processing tray 260 by the conveyance roller pairs. However, depending on the processing content in step S803, liquid may not be applied to all the sheets P constituting the sheet bundle Pb. Then, separately from the liquid application determination process in step S803, the controller 100 may cause the liquid applier 31 to apply the liquid to the binding position B1 at intervals of one in every "n" sheets. Note that "n" is a natural number greater than 1 and less than "N" (i.e., 1<n<N).

When the controller 100 determines that the number of sheets P placed on the processing tray 260 reaches the given number N (of one sheet bundle Pb) (YES in step S804), as illustrated in FIG. 9C, the controller 100 drives the binder movement motor 50 to move the crimper 32 in the main scanning direction so that the crimper 32 faces the binding position B1 (in step S805).

In step S806, the controller 100 crimps and binds the sheet bundle Pb accommodated in the processing tray 260 and outputs the sheet bundle Pb to the lower shift tray 236. Specifically, the controller 100 drives the contact-separation motor 32d to cause the pair of binding teeth 32a and 32b to sandwich the binding position B1 on the sheet bundle Pb placed on the processing tray 260. The controller 100 rotates the conveyance roller pair 233 to eject the sheet bundle Pb thus crimped and bound to the lower shift tray 236.

When the series of binding process is completed, as illustrated in FIG. 9D, the controller 100 drives the binder movement motor 50 to move the binder 25 to the standby position HP (in step S807).

A detailed description is given below of the liquid application determination process.

Specifically, the liquid application determination process in step S803 is described below. When the liquid application determination process is executed in the post-processing apparatus 20 according to the present embodiment, the controller 100 uses a determination condition for determining whether liquid application is necessary, in other words, whether liquid application is to be performed.

Before the description with reference to the flowchart, the description is given below with reference to the timing charts of FIGS. 10 to 15. The timing charts illustrate a time series of the liquid application operation, the sheet alignment operation, and the ejection operation of the sheet bundle Pb. Broken lines illustrated in FIGS. 10 to 15 illustrate conveyance intervals at which sheets P are conveyed to the processing tray 260. A sheet P1, a sheet P2, . . . represent the order of conveyance of sheets P. The last sheet Pe indicates a sheet P to be finally conveyed to the processing tray 260 among the plurality of sheets P constituting one sheet bundle Pb. Therefore, after the last sheet Pe is conveyed to the processing tray 260 and predetermined processing is completed, the binding process is performed.

After completion of the binding process, one sheet bundle Pb is ejected from the processing tray 260.

First, a description is given of the "productivity of the binding process" which is important for determining whether the liquid application is necessary. The number of sheet bundles Pb that can be ejected per unit time is defined as the productivity of the binding process. In this case, it can be said that the productivity of the binding process is determined by "a time (conveyance time t1) defined by a conveyance interval at which the sheet P is conveyed toward the processing tray 260", "an alignment time t2 for performing alignment in the processing tray 260", "a liquid application time t3 for applying liquid to the sheet P", "a binding time t4 for performing binding on the sheet bundle Pb", and "an ejection time t5 for ejecting the sheet bundle Pb from the processing tray 260". In particular, the conveyance time t1 is determined by the processing capability of the MFP 10 for ejecting the sheet P to the post-processing apparatus 20.

In FIG. 16, the number of sheets per minute at which the MFP 10 forms an image on a sheet P and ejects the sheet P to the post-processing apparatus 20 is expressed as "the productivity of the MFP 10". As illustrated in FIG. 16, the productivity of the MFP 10 varies depending on the combination of the size, type, and thickness (sheet thickness) of the sheet P, and also varies depending on the type of the MFP 10. The MFP 10 holds in advance processing capability data corresponding to the productivity data (see FIG. 16) based on its own type. The post-processing apparatus 20 may receive the processing capability data from the MFP 10 or may store the processing capability data in, for example, the HDD 104 in advance.

The post-processing apparatus 20 can calculate the conveyance time t1 per sheet P determined by the processing capability of the MFP 10, based on the processing capability as illustrated in FIG. 16. The conveyance time t1 may be calculated by the MFP 10 and notified to the post-processing apparatus 20.

A description is given below of the timing charts.

FIG. 10 illustrates a comparison between the conveyance time t1 as a conveyance interval time in which one sheet P is conveyed to the processing tray 260 and a first total time t10 that is a combination of the alignment time t2 and the liquid application time t3 necessary for the sheet P. The first total time t10 corresponds to the liquid application time. In the example of FIG. 10, the conveyance time t1 is longer than the first total time t10. Therefore, even if the liquid application is performed for each sheet P, it is not necessary to cause the conveyance of the subsequent sheet to stand by, and thus the productivity of the binding process is not reduced.

The example of FIG. 11 is an example in which the first total time t10 as the liquid application time is longer than the conveyance time t1 as the conveyance interval time. In this case, it is necessary to cause the conveyance of the subsequent sheet to stand by until the first total time t10 elapses. For example, it is necessary to cause the MFP 10 to stop the ejection operation of the sheet P or the image forming process, which would cause a reduction in productivity.

In such a case, for example, the controller 100 does not perform the liquid application on the sheet P2 and the sheet P4. Then, the liquid application time t3 corresponding to the sheet P2 and the sheet P4 does not occur, and the first total time t10 is equivalent to the alignment time t2. Normally, since the alignment time t2 is shorter than the conveyance time t1, it is not necessary to cause the conveyance of the subsequent sheet to stand by, and the productivity of the binding process can be enhanced.

Figure 12:
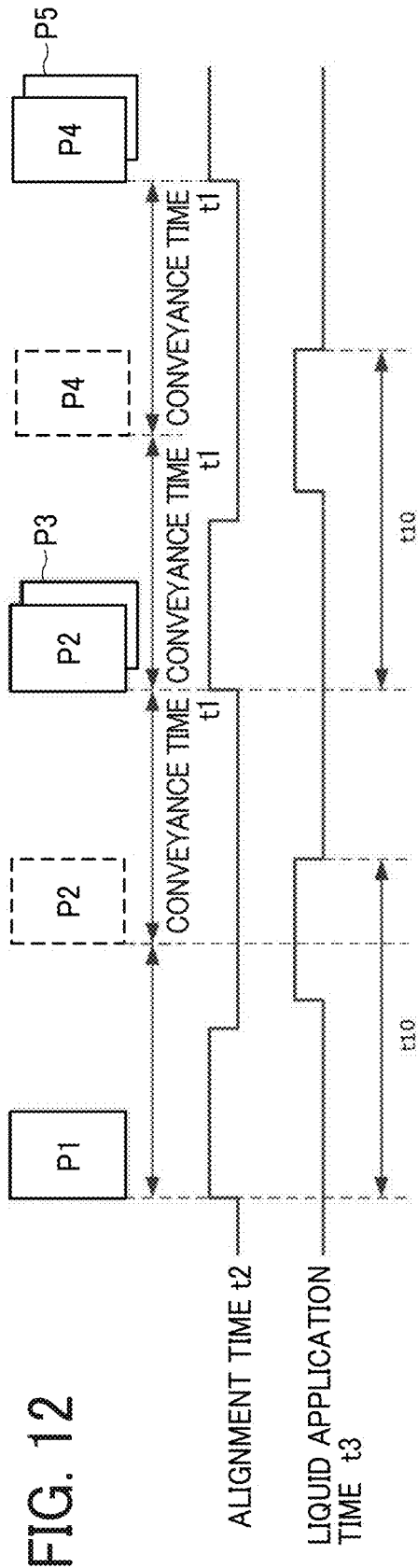
FIG. 12 is a timing chart illustrating still another example of the relation between liquid application operation and conveyance time of a sheet.

As described above, the post-processing apparatus 20 includes the overlay conveyance section 250. In the overlay conveyance section 250, the preceding medium is temporarily retreated to the switchback conveyance passage, and the subsequent medium, which is conveyed following the preceding medium, can be conveyed with the subsequent medium being overlaid with the preceding medium. When the pre-stacking process is performed, as illustrated in FIG. 12, it is not necessary to cause the conveyance of the sheet P from the MFP 10 to stand by, even if the first total time t10 is longer than the conveyance time t1. In addition, the alignment time t2 for the sheet P2 and the sheet P4 can be omitted, thus enhancing the productivity of the binding process.

The above description is of a method for enhancing the productivity of the binding process in the relation between the conveyance of the sheets P until the sheet bundle Pb is formed by the sheets P and the time required for alignment and liquid application with respect to the sheets P. Next, a description is given of a method for determining whether liquid application is necessary for the last sheet (last sheet Pe) of the sheet bundle Pb and enhancing the productivity of the binding process.

Figure 13:
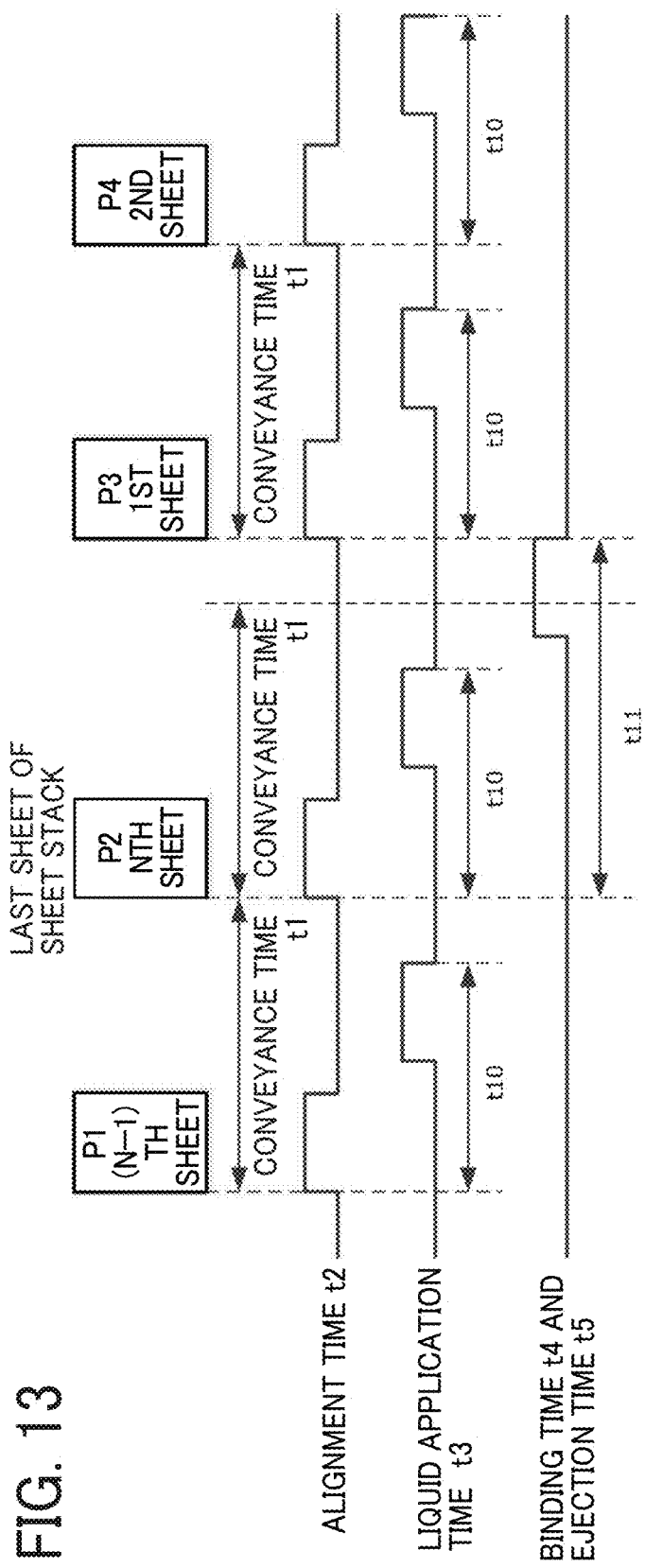
FIG. 13 is a timing chart illustrating still another example of the relation between liquid application operation and conveyance time of a sheet.

The example of FIG. 13 illustrates a case where a second total time t11 including the binding time t4 for performing binding on the sheet bundle Pb and the ejection time t5 for ejecting the sheet bundle Pb from the processing tray 260 is compared with the conveyance time t1, to determine whether liquid application on the last sheet Pe is to be performed. As illustrated in FIG. 13, when the second total time t11 as a liquid application time, which is the total time of the alignment time t2, the liquid application time t3, the binding time t4, and the ejection time t5 for the last sheet Pe of one sheet bundle Pb, is longer than the conveyance time t1, it is necessary to temporarily cause the conveyance of a sheet P3 (subsequent medium) of the next one sheet bundle Pb to stand by. In other words, the productivity of the binding process is lowered.

Figure 14:
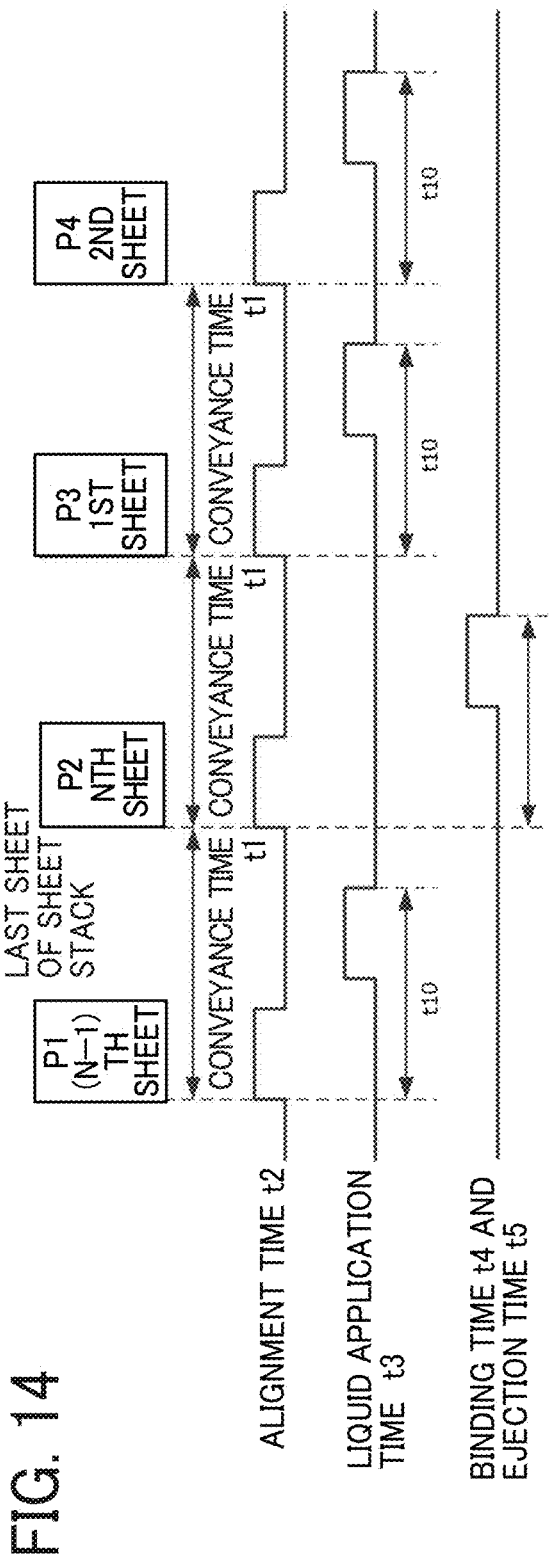
FIG. 14 is a timing chart illustrating still another example of the relation between liquid application operation and conveyance time of a sheet.

In the case illustrated in FIG. 13, the liquid application operation is not performed on the last sheet Pe (sheet P2) of one sheet bundle Pb as illustrated in FIG. 14. Then, the liquid application time t3 for the last sheet Pe of one sheet bundle Pb does not occur, and the second total time t11 is equivalent to the total of the alignment time t2, the binding time t4, and the ejection time t5. In this case, since the second total time t11 is shorter than the conveyance time t1, there is no need to cause the conveyance of the subsequent sheet for forming the next one sheet bundle Pb to stand by. Thus, the productivity of the binding process can be enhanced.

Figure 15:
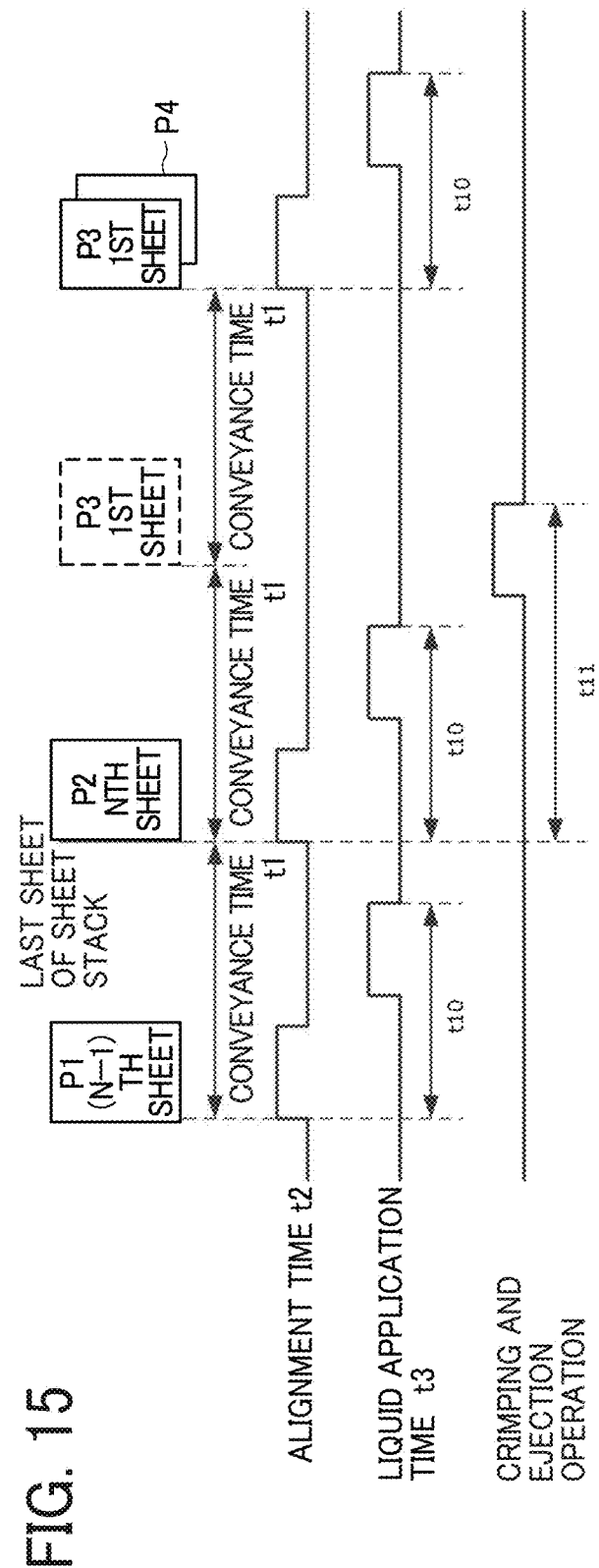
FIG. 15 is a timing chart illustrating still another example of the relation between liquid application operation and conveyance time of a sheet.

As illustrated in FIG. 15, the sheet P conveyed after the last sheet Pe of the sheet bundle Pb, i.e., the sheet P3 constituting the next sheet bundle Pb is temporarily retreated to the switchback conveyance passage in the overlay conveyance section 250, and the subsequent sheet P4 and the preceding sheet P3 are conveyed in an overlay manner. Thus, even in the case illustrated in FIG. 14, a decrease in productivity of the binding process can be avoided. The above-described process can also deal with a case where it is determined that it will be disadvantageous in binding strength if the liquid application to the last sheet Pe of one sheet bundle Pb is omitted. In other words, the above-described process can maintain the binding strength while preventing a decrease in productivity of the binding process.

Figure 17:
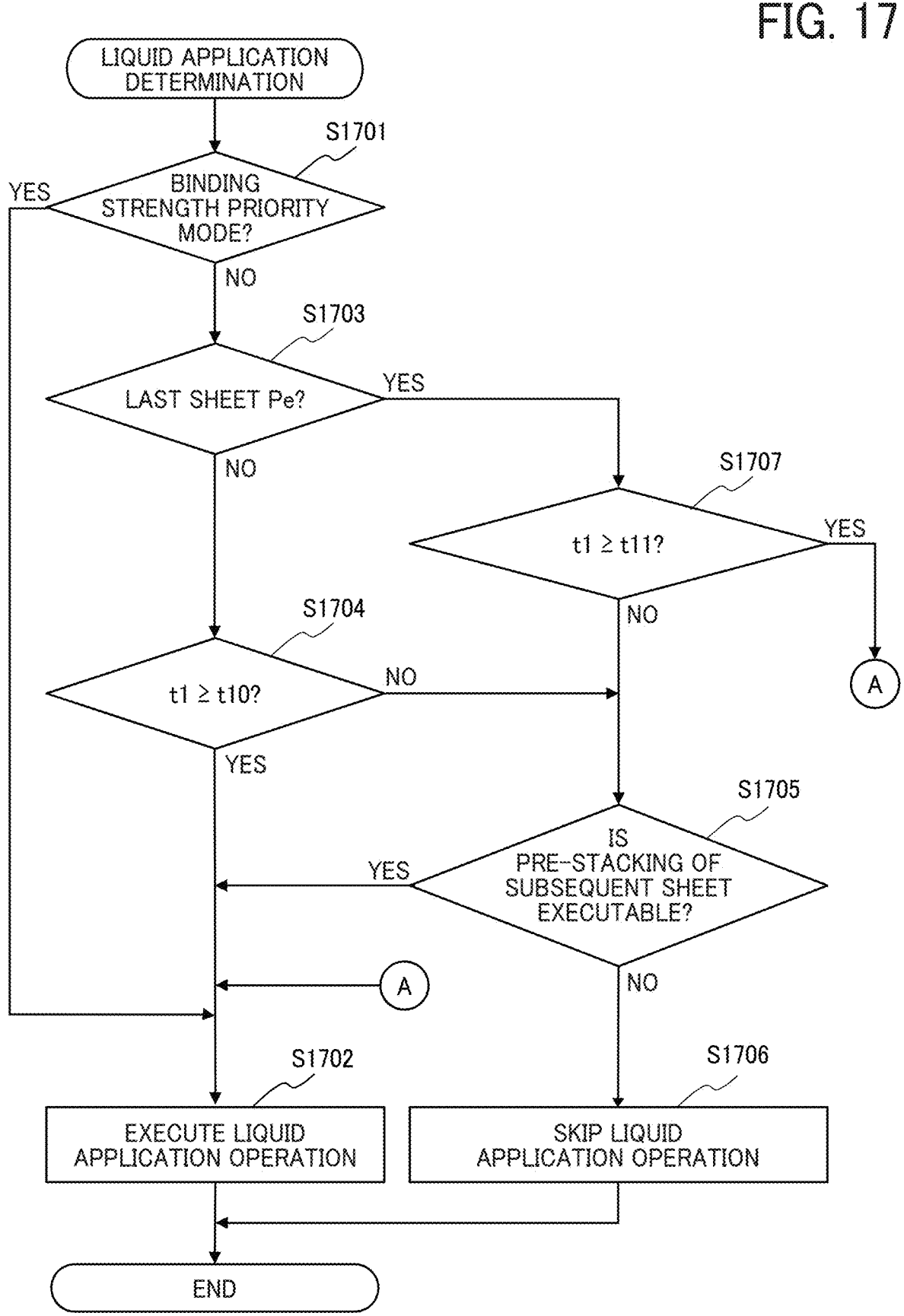
FIG. 17 is a flowchart illustrating details of a liquid application determination process, according to an embodiment of the present disclosure.

FIG. 17 is a flowchart illustrating details of the liquid application determination process illustrated in step S803. In step S1701, the controller 100 determines whether the binding mode is set to the "binding strength priority mode". If the binding mode is the binding strength priority mode (YES in step S1701), in step S1702, the controller 100 executes the liquid application operation for each sheet P even if the productivity of the binding process decreases. If the binding mode is not the binding strength priority mode (NO in step S1702), in step S1703, the controller 100 determines whether the sheet P to be determined is the last sheet Pe of one sheet bundle Pb.

If the sheet P to be determined is not the last sheet Pe (NO in step S1703), the sheet P to be determined is in the course of forming one sheet bundle Pb and corresponds to the state described with reference to FIG. 10. Then, in step S1704, the controller 100 compares the conveyance time t1 with the first total time t10. If the conveyance time t1 is equal to or longer than the first total time t10 (t1>t10), the productivity of the binding process does not decrease even if liquid is applied to the sheet P to be determined. Then, in this case (YES in step S1704), in step S1702, the controller 100 executes the liquid application operation to the sheet P.

In step S1704, if the conveyance time t1 is shorter than the first total time t10 (t1<t10), one sheet bundle Pb is in the course of being formed, which corresponds to the state described with reference to FIG. 11. Accordingly, if liquid is applied to the sheet P to be determined, the productivity of the binding process decreases. For this reason, in this case (NO in step S1704), in step S1705, the controller 100 determines whether the pre-stacking of conveying the subsequent sheet (sheet P2) to the retreat conveyance passage and aligning the subsequent sheet (sheet P2) in advance is executable with respect to the sheet P (sheet P1) to be processed. For example, the controller 100 determines that pre-stacking is executable when the subsequent sheet (sheet P2) satisfies the conditions illustrated in FIG. 16 that the subsequent sheet has a pre-stackable sheet size (for example, A4 vertical or A4 horizontal) and a pre-stackable sheet type and thickness (for example, plain paper or thick paper).

If the pre-stacking is executable (YES in step S1705), the current state corresponds to the state described with reference to FIG. 12. Thus, in step S1702, the controller 100 executes the liquid application on the sheet P (sheet P1) to be determined. If the pre-stacking is not executable (NO in step S1705), in step S1706, the controller 100 skips the liquid application operation to the sheet P (sheet P1).

If the sheet P to be determined is the last sheet Pe (YES in step S1703), the current state is at the stage in which the binding operation and the ejection operation to be performed on one sheet bundle Pb, thus corresponds to the state described with reference to any one of FIGS. 13, 14, and 15. Then, in step S1707, the controller 100 compares the conveyance time t1 with the second total time t11. If the conveyance time t1 is equal to or longer than the second total time t11 (t1>t11), the current state corresponds to the state described with reference to FIG. 13. Therefore, even if water is added to the sheet P to be determined (last sheet Pe), the productivity of the binding process does not decrease. Then, in this case (YES in step S1707), in step S1702, the controller 100 executes the liquid application operation to the sheet P.

If the conveyance time t1 is shorter than the second total time t11 (t1<t11), the current state corresponds to the state described with reference to FIG. 13. In this case, if liquid is applied to the last sheet Pe to be determined, the productivity of the binding process decreases. Then, in step S1705, the controller 100 determines whether the pre-stacking can be executed on the subsequent sheet (sheet P3) of the last sheet Pe (sheet P2).

If the pre-stacking is executable (YES in step S1705), the current state corresponds to the state described with reference to FIG. 15. Therefore, in step S1702, the controller 100 executes the liquid application operation on the last sheet Pe to be determined. If the pre-stacking is not executable (NO in step S1705), in step S1706, the controller 100 skips the liquid application operation to the last sheet Pe since the current state corresponds to the state described with reference to FIG. 14.

As described above, the liquid application determination process (in step S803) is not limited to the determination and setting of execution or non-execution of the liquid application operation based on the comparison between the conveyance time t1 and the time required for executing the post-processing (the first total time t10 and the second total time t11). For example, the execution or non-execution of the liquid application operation may be set based on a predetermined pattern of execution or non-execution of liquid application. Examples of the predetermined pattern of execution or non-execution of liquid application include a setting in which the liquid application operation is performed only on the odd-numbered sheet or the even-numbered sheet P among the plurality of sheets P constituting the sheet bundle Pb, a setting in which the liquid application operation is not performed only on the odd-numbered sheet or the even-numbered sheet P among the plurality of sheets P constituting the sheet bundle Pb, or a setting in which the liquid application operation is performed or not performed on every two sheets.

In addition, the predetermined pattern of execution or non-execution of liquid application may be set such that, even in a case where the liquid application operation is skipped in step S1706, the liquid application operation is executed when the controller 100 determines that the desired binding strength cannot be obtained without performing the liquid application. Examples of the case where the controller 100 determines that the required binding strength cannot be obtained without applying liquid include a case where the number of times of liquid application operations up to a sheet P (N-th sheet) to be determined, among the plurality of sheets P constituting the sheet bundle Pb, is less than a preset number of times of liquid application operations (a threshold number of times of liquid application operations by which the bound state of the sheet bundle Pb cannot be maintained if the number of times of liquid application operations up to the sheet P to be determined is less than the preset number of times), and a case where the number of consecutive sheets P not subjected to the liquid application, among the plurality of sheets P constituting the sheet bundle Pb, is equal to or more than a preset number of sheets (i.e., a number of sheets by which the bound state of the sheet bundle Pb cannot be maintained if the number of sheets P not subjected to the liquid application is equal to or more than the preset number).

In the related art, to increase the binding strength in a medium processing apparatus that performs crimp binding, a technique is known in which water is added in advance to a position at which the binding teeth come into contact with sheets so that the binding teeth easily bite into the sheets.

The technique includes a hydration processing unit for adding water to a sheet. Water addition by the hydration processing unit is performed after execution of alignment for aligning, for example, a side end and a leading end of a sheet bundle every time a sheet is stacked on the sheet bundle. As a result, water is individually added to the aligned subsequent sheets, and finally, the crimp binding can be performed at a position where the binding teeth easily bite into the sheets. Accordingly, when a subsequent sheet is conveyed before the completion of the hydration process, it is necessary to temporarily put the conveyance of the subsequent sheet in a standby state and wait for the completion of the hydration process.

Therefore, in such a technique, the productivity of the crimp binding process may decrease due to the hydration process.

According to the above-described embodiment of the present disclosure, for example, the following operational effects can be achieved.

When the crimp binding process is executed in the post-processing apparatus 20, a sheet bundle Pb may be formed in relation to the processing capability of the MFP 10 and the productivity of the binding process until the sheet bundle Pb is ejected may decrease. In such a case, the liquid application to sheets is skipped to an extent in which the binding strength of the crimp binding is acceptable. Such a configuration can prevent a reduction in productivity of the binding process.

In addition, the execution or non-execution of liquid application to any sheet(s) can be determined in advance, instead of determining that the productivity of the binding process decreases if liquid is applied to the sheet P.

Further, in a case where the operation mode in which the productivity of the binding process is prioritized is selected, the post-processing apparatus 20 can prevent the productivity of the binding process from being lowered by skipping the liquid application to sheets P to an extent in which the binding strength of the crimp binding is acceptable.

In addition, obtaining the time interval (conveyance time t1) of the sheets P ejected from the MFP 10 allows determination of whether the productivity of the binding process as the image forming system 1000 does not decrease even if the liquid application is performed.

When the controller 100 determines that liquid is not applied to a sheet P, the sheet P is temporarily conveyed to the retreat conveyance passage and is conveyed while being overlaid with the subsequent sheet P. Accordingly, the processing of the plurality of sheets P aligned in a lump is performed, thus allowing a reduction in the entire processing time and preventing a decrease in the productivity of the binding process.

When the controller 100 determines that it will be disadvantageous in binding strength if the liquid application to the last sheet P (last sheet Pe) of the plurality of sheets P constituting one sheet bundle Pb is omitted, the controller 100 performs the liquid application to the last sheet Pe. If the subsequent sheet P constituting the next one sheet bundle Pb can be temporarily retreated to the retreat conveyance passage, the liquid application on the last sheet Pe can be executed, thus preventing a decrease in the productivity of the binding process.

The control method described above may be implemented by, for example, a program. That is, the control method may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Now, a description is given of some aspects of the present disclosure.

Initially, a description is given of a first aspect.

A medium processing apparatus includes: a conveyor to convey a medium; a liquid applier to apply liquid to the medium conveyed by the conveyor; and a crimper to press and deform a medium bundle including at least one medium to which the liquid is applied by the liquid applier, to bind the medium bundle. The liquid applier selectively performs application of the liquid to all media constituting the medium bundle or application of the liquid to only some of the media constituting the medium bundle, based on a conveyance interval at which the media are conveyed by the conveyor.

Now, a description is given of a second aspect.

In the medium processing apparatus according to the first aspect, when a liquid application time from when one medium of the media constituting the medium bundle reaches a liquid application position to when liquid application ends is shorter than a conveyance interval time corresponding to the conveyance interval, the liquid applier applies the liquid to a medium conveyed after the one medium.

Now, a description is given of a third aspect.

The medium processing apparatus according to the first aspect or the second aspect further includes an operation mode setting unit to, based on a selection of a user, set an operation mode from operation modes including a binding strength priority mode in which the liquid is applied to each one of the media constituting the medium bundle and a productivity priority mode in which a time until the medium bundle is bound by the crimper and ejected is shortened. When the operation mode is the productivity priority mode and a liquid application time from when one medium of the media constituting the medium bundle reaches a liquid application position to when liquid application ends is longer than a conveyance interval time corresponding to the conveyance interval, the liquid applier skips application of the liquid to a medium conveyed after the one medium or applies the liquid to some of media conveyed after the one medium.

Now, a description is given of a fourth aspect.

In the medium processing apparatus according to the third aspect, when the operation mode is the binding strength priority mode, the liquid applier applies the liquid to a medium conveyed after the one medium even when the liquid application time is longer than the conveyance interval time.

Now, a description is given of a fifth aspect.

In the medium processing apparatus according to any one of the first to fourth aspects, the liquid applier determines whether the liquid is to be applied to a preceding medium precedent to the medium, based on a result of comparison between the conveyance interval and a time until completion of a process performed in a stage preceding a process of applying the liquid to the medium.

Now, a description is given of a sixth aspect.

In the medium processing apparatus according to any one of the first to fifth aspects, the conveyor includes a conveyance passage to convey the medium to a tray on which the media are to be placed, and a retreat conveyance passage that is disposed upstream from the tray in a conveyance direction of the medium and is different from the conveyance passage. The conveyor temporarily conveys a medium to which the liquid is not applied by the liquid applier to the retreat conveyance passage (E), and then overlays a subsequent medium, which is conveyed after the medium to which the liquid is not applied, with the medium to which the liquid is not applied, and conveys the subsequent medium overlaid on the medium to the tray, and the liquid applier applies the liquid to the subsequent medium overlaid with the medium.

Now, a description is given of a seventh aspect.

In the medium processing apparatus according to the sixth aspect, when a subsequent medium that is conveyed next to a last medium conveyed last among a plurality of media constituting one medium bundle is conveyed to the retreat conveyance passage, the liquid applier applies the liquid to the last medium.

Now, a description is given of an eighth aspect.

An image forming system includes: an image forming apparatus including an image forming unit to form an image on a plurality of media; and the medium processing apparatus according to any one of the first to seventh aspects to crimp and bind the plurality of media on which the image is formed by the image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A medium processing apparatus, comprising:
a conveyor configured to convey a medium;
a liquid applier configured to apply liquid to the medium conveyed by the conveyor; and
a crimper configured to press and deform a medium bundle including at least one medium to which the liquid is applied by the liquid applier, to bind the medium bundle,
the liquid applier configured to selectively perform application of the liquid to all media constituting the medium bundle in a first mode of operation and application of the liquid to only some of the media constituting the medium bundle in a second mode of operation.

2. The medium processing apparatus according to claim 1, wherein when a liquid application time from when one medium of the media constituting the medium bundle reaches a liquid application position to when liquid application ends is shorter than a conveyance interval time corresponding to a conveyance interval at which the media are conveyed by the conveyor, the liquid applier applies the liquid to a medium conveyed after the one medium.

3. The medium processing apparatus according to claim 1, further comprising an operation mode setting unit configured to, based on a selection of a user, set an operation mode from operation modes including a binding strength priority mode in which the liquid is applied to each one of the media constituting the medium bundle and a productivity priority mode in which a time until the medium bundle is bound by the crimper and ejected is shortened,
wherein when the operation mode is the productivity priority mode and a liquid application time from when one medium of the media constituting the medium bundle reaches a liquid application position to when liquid application ends is longer than a conveyance interval time corresponding to a conveyance interval at which the media are conveyed by the conveyor, the liquid applier skips application of the liquid to a medium conveyed after the one medium or applies the liquid to at least one medium of media conveyed after the one medium.

4. The medium processing apparatus according to claim 3, wherein when the operation mode is the binding strength priority mode, the liquid applier applies the liquid to a medium conveyed after the one medium even when the liquid application time is longer than the conveyance interval time.

5. The medium processing apparatus according to claim 1, wherein the liquid applier determines whether the liquid is to be applied to a preceding medium precedent to the medium, based on a result of comparison between a conveyance interval at which the media are conveyed by the conveyor and a time until completion of a process performed in a stage preceding a process of applying the liquid to the medium.

6. The medium processing apparatus according to claim 1, wherein the conveyor includes a conveyance passage to convey the medium to a tray on which the media are to be placed, and a retreat conveyance passage that is disposed upstream from the tray in a conveyance direction of the medium and is different from the conveyance passage, and
wherein the conveyor temporarily conveys a medium to which the liquid is not applied by the liquid applier to the retreat conveyance passage, and then overlays a subsequent medium, which is conveyed after the medium to which the liquid is not applied, with the medium to which the liquid is not applied, and conveys the subsequent medium overlaid with the medium to the tray, and the liquid applier applies the liquid to the subsequent medium overlaid on the medium.

7. The medium processing apparatus according to claim 6, wherein when a subsequent medium that is conveyed next to a last medium conveyed last among media constituting one medium bundle is conveyed to the retreat conveyance passage, the liquid applier applies the liquid to the last medium.

8. An image forming system, comprising:
an image forming apparatus including an image former configured to form an image on the media constituting the medium bundle; and
the medium processing apparatus according to claim 1 configured to press and deform the media constituting the medium bundle on which the image is formed by the image forming apparatus.

9. The medium processing apparatus according to claim 1, wherein the liquid applier is configured to selectively perform application of the liquid in the first mode of operation and application of the liquid in the second mode of operation based on a conveyance interval at which the media are conveyed by the conveyor.

10. A medium processing apparatus, comprising:
a conveyor configured to convey a medium;
a liquid applier configured to apply liquid to the medium conveyed by the conveyor; and
a crimper configured to press and deform a medium bundle including at least one medium to which the liquid is applied by the liquid applier, to bind the medium bundle,
wherein the liquid applier is configured to
perform application of the liquid to only some media constituting the medium bundle, so that not all of the media constituting the medium bundle have liquid applied thereto, and
selectively perform application of the liquid based on a conveyance interval at which the media are conveyed by the conveyor.

11. The medium processing apparatus according to claim 10,
wherein when a liquid application time from when one medium of the media constituting the medium bundle reaches a liquid application position to when liquid application ends is shorter than a conveyance interval time corresponding to the conveyance interval at which the media are conveyed by the conveyor, the liquid applier applies the liquid to a medium conveyed after the one medium.

12. The medium processing apparatus according to claim 10,
wherein the liquid applier determines whether the liquid is to be applied to a preceding medium precedent to the medium, based on a result of comparison between the conveyance interval at which the media are conveyed by the conveyor and a time until completion of a process performed in a stage preceding a process of applying the liquid to the medium.

13. An image forming system, comprising:
an image forming apparatus including an image former configured to form an image on the media constituting the medium bundle; and
the medium processing apparatus according to claim 10 configured to press and deform the media constituting the medium bundle on which the image is formed by the image forming apparatus.

14. A medium processing apparatus, comprising:
a conveyor configured to convey a medium;
a liquid applier configured to apply liquid to the medium conveyed by the conveyor; and
a crimper configured to press and deform a medium bundle including at least one medium to which the liquid is applied by the liquid applier, to bind the medium bundle,
wherein the liquid applier is configured to perform application of the liquid to only some media constituting the medium bundle, so that not all of the media constituting the medium bundle have liquid applied thereto,
wherein the conveyor includes a conveyance passage to convey the medium to a tray on which the media are to be placed, and a retreat conveyance passage that is disposed upstream from the tray in a conveyance direction of the medium and is different from the conveyance passage, and
wherein the conveyor temporarily conveys a medium to which the liquid is not applied by the liquid applier to the retreat conveyance passage, and then overlays a subsequent medium, which is conveyed after the medium to which the liquid is not applied, with the medium to which the liquid is not applied, and conveys the subsequent medium overlaid with the medium to the tray, and the liquid applier applies the liquid to the subsequent medium overlaid on the medium.

15. The medium processing apparatus according to claim 14,
wherein when a subsequent medium that is conveyed next to a last medium conveyed last among media constituting one medium bundle is conveyed to the retreat conveyance passage, the liquid applier applies the liquid to the last medium.

16. An image forming system, comprising:
an image forming apparatus including an image former configured to form an image on the media constituting the medium bundle; and
the medium processing apparatus according to claim 14 configured to press and deform the media constituting the medium bundle on which the image is formed by the image forming apparatus.

* * * * *